United States Patent
Kim et al.

(10) Patent No.: US 10,416,950 B2
(45) Date of Patent: Sep. 17, 2019

(54) TILED DISPLAY SYSTEM AND METHOD FOR PROCESSING IMAGES THEREOF

(71) Applicant: SAMSUNG ELECTRONICS CO., LTD., Suwon-si (KR)

(72) Inventors: Dae-sik Kim, Hwaseong-si (KR); Sergey Shestak, Suwon-si (KR); Seong-woo Cho, Suwon-si (KR); Ju-hee Seo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 14/613,842

(22) Filed: Feb. 4, 2015

(65) Prior Publication Data

US 2015/0286457 A1 Oct. 8, 2015

(30) Foreign Application Priority Data

Apr. 7, 2014 (KR) .................. 10-2014-0041164

(51) Int. Cl.
*G09G 5/00* (2006.01)
*G06F 3/14* (2006.01)
(Continued)

(52) U.S. Cl.
CPC ......... *G06F 3/1446* (2013.01); *G02B 3/0037* (2013.01); *G02B 6/0008* (2013.01);
(Continued)

(58) Field of Classification Search
None
See application file for complete search history.

(56) References Cited

U.S. PATENT DOCUMENTS 8,330,900 B2 12/2012 Kuo et al.
8,472,114 B2 6/2013 Watanabe
(Continued)

FOREIGN PATENT DOCUMENTS

CN 101587670 A 11/2009
CN 101965604 A 2/2011
(Continued)

OTHER PUBLICATIONS

Communication dated Aug. 1, 2018, issued by the State Intellectual Property Office of the People's Republic of China in counterpart Chinese Patent Application No. 201510161072.9.

*Primary Examiner* — Barry Drennan
*Assistant Examiner* — Khoa Vu
(74) *Attorney, Agent, or Firm* — Sughrue Mion, PLLC

(57) ABSTRACT

A tiled display system apparatus including a plurality of display apparatuses and a method for processing images thereof are provided. The tiled display apparatus includes: a plurality of display apparatuses configured to display an image, each display apparatus of the plurality of display apparatuses including a display panel including: an activated area, an inactivated area which is bent from the activated area, and a bending area provided between the activated area and the inactivated area; and an optical member provided on the bending area, the optical member configured to output light emitted from the bending area, wherein each of the plurality of display apparatuses is configured to correct a portion of the image corresponding to the light emitted from the bending area.

20 Claims, 31 Drawing Sheets

(51) Int. Cl.
*F21V 8/00* (2006.01)
*G02B 3/00* (2006.01)

(52) U.S. Cl.
CPC .......... *G09G 2300/026* (2013.01); *G09G 2340/0407* (2013.01); *G09G 2360/04* (2013.01)

(56) References Cited

U.S. PATENT DOCUMENTS

| | | | |
|---|---|---|---|
| 8,780,015 B2 | 7/2014 | Watanabe | |
| 8,807,775 B2 | 8/2014 | Sekiguchi et al. | |
| 2005/0078104 A1* | 4/2005 | Matthies | G02F 1/13336 345/204 |
| 2006/0077544 A1* | 4/2006 | Stark | G02F 1/13336 359/448 |
| 2010/0277665 A1 | 11/2010 | Kuo et al. | |
| 2011/0025594 A1* | 2/2011 | Watanabe | G02F 1/13336 345/102 |
| 2011/0057861 A1* | 3/2011 | Cok | H01L 27/3293 345/1.3 |
| 2011/0242686 A1* | 10/2011 | Watanabe | G02B 17/0884 359/804 |
| 2014/0071657 A1* | 3/2014 | Sekiguchi | G02F 1/1333 362/97.1 |
| 2014/0092346 A1* | 4/2014 | Yang | G02F 1/133308 349/84 |
| 2014/0104712 A1 | 4/2014 | Sekiguchi et al. | |
| 2014/0192463 A1* | 7/2014 | Jung | G06F 1/1601 361/679.01 |
| 2015/0286457 A1 | 10/2015 | Kim et al. | |

FOREIGN PATENT DOCUMENTS

| | | |
|---|---|---|
| CN | 102257549 A | 11/2011 |
| CN | 202650440 U | 1/2013 |
| CN | 102982744 A | 3/2013 |
| CN | 202956999 U | 5/2013 |
| CN | 103650020 A | 3/2014 |
| CN | 104464538 A | 3/2015 |
| TW | 201039014 A | 11/2010 |

* cited by examiner

TILED DISPLAY SYSTEM AND METHOD FOR PROCESSING IMAGES THEREOF

CROSS-REFERENCE TO RELATED APPLICATION

This application claims priority from Korean Patent Application No. 10-2014-0041164 filed on Apr. 7, 2014, in the Korean Intellectual Property Office, the disclosure of which is incorporated herein by reference in its entirety.

TECHNICAL FIELD

Apparatuses and methods consistent with exemplary embodiments relate to a tiled display apparatus including a plurality of display apparatuses and a method for processing images thereof.

BACKGROUND

A display apparatus provides a user with an image using a display panel. For example, a television (TV) is widely used in most households. As users tend to have a desire to view contents on a large screen, display apparatuses with larger size display panels have been developed and distributed.

However, there are limitations to enlarging a size of a display panel. Therefore, more attention is paid to a tiled display system which may connect a plurality of small display apparatuses to realize a large display screen.

In the related art, a plurality of display apparatuses which form a tiled display system are coupled to each other to provide a wider display area which is seamless.

However, a display apparatus includes an inactivated area where an image is not displayed. Normally, the inactivated area is called a bezel, and the bezel is used to seal display panels and electrically connect active elements. In a large liquid crystal display (LCD) panel or an organic light-emitting diode (OLED) display panel, a minimum width of bezel is about 3-10 mm. Therefore, when a plurality of display apparatuses are connected to form a tiled display system, a user may have viewing disturbance by bezels therebetween.

FIG. 1 is a view to explain operations of a related art tiled display system. FIG. 1 illustrates a tiled display system in which three display apparatuses 10, 20, and 30 are disposed side by side. Bezels of top, bottom, left, and right edges of the display apparatus 10, 20 and 30 are inactivated areas. For example, each display apparatus 10, 20, and 30 includes inactivated areas 10-1, 10-2, 20-1, 20-2, 30-1 and 30-2, respectively, on left and right edges of display areas 1, 2 and 3. Therefore, when the display apparatuses 10, 20, and 30 are disposed in a horizontal direction, an inactive area 10-2 on the right side of the first display apparatus 10 and an adjacent inactive area 20-1 on the left side of the second display apparatus 20 form one viewing disturbance area, and an inactive area 20-2 on the right side of the second display apparatus 20 and an adjacent inactive area 30-1 of the third display apparatus 30 form another viewing disturbance area.

Therefore, a user may notice dark vertical lines that are present in one large screen due to the viewing disturbance areas. Accordingly, a user will easily recognize that an object which needs to be continuously connected is shown as two cut-off portion 40-1 and 40-2 as shown in FIG. 1.

Similarly, when the tiled display system includes a plurality of display apparatus in a plurality of rows and columns, bezels in top and bottom also form viewing disturbance areas in addition to the left and right bezels forming viewing disturbance areas, and thus, a user may recognize vertical and horizontal stripes are present in a display area.

Accordingly, there is a need to develop technology to minimize viewing disturbance attributable to the inactivated area in the tiled display system.

SUMMARY

One or more exemplary embodiments provide a tiled display system which may minimize viewing disturbance of a user using an optical member disposed between a plurality of display apparatus and a method for processing images thereof.

According to an aspect of an exemplary embodiment, there is provided a tiled display apparatus including: a plurality of display apparatuses configured to display an image, each display apparatus of the plurality of display apparatuses including a display panel having: an activated area, an inactivated area which is bent from the activated area, and a bending area provided between the activated area and the inactivated area; and a plurality of optical members, each optical member provided on the bending area and configured to output light emitted from the bending area, wherein each of the plurality of display apparatuses is configured to correct a portion of the image corresponding to the light emitted from the bending area.

The optical member may include: a first surface extending parallel with the activated area; a second surface extending orthogonal from the first plane and extending parallel with the inactivated area; a first curved surface provided between a back end of the first surface and a back end of the second surface and having a shape corresponding to the bending area; and a second curved surface facing the first curved surface, provided between a front end of the first surface and the second surface, and having a radius of curvature which is less than the first curved surface, wherein the optical member is configured to output the light emitted from the bending area of the display panel to the first surface through the first curved surface.

The optical member may include a plurality of light guide layers provided between the first curved surface and the first surface and configured to guide the emitted light from the bending area of the display panel to the first surface.

Each of the plurality of light guide layers comprises a mirror on a boundary surface of each of the plurality of light guide layers.

The optical member may include a plurality of cylindrical light guide poles provided between the first curved surface and the first surface and configured to guide the emitted light from the bending area of the display panel to the first surface.

The optical member may be made of transparent glass or plastic.

The optical member may include a prism covering a notch provided between a connection area of two adjacent display apparatuses of the plurality of display apparatuses.

The prism may include: a transparent housing having a shape corresponding to the notch; and transparent liquid filled in the transparent housing.

At least one display panel of the plurality of display apparatuses may include: a flexible panel; a case configured to support the at least one display panel; and a supporting frame provided inside the case and configured to maintain a curvature of the bending area of the flexible panel.

The optical member may include a Gabor super lens provided on a notch formed between a connection area of two adjacent display apparatuses.

The Gabor super lens may include a concave surface.

Each of the plurality of display apparatuses may include a concave display panel or a convex display panel.

The plurality of display apparatuses may be arranged along a convex surface, a concave surface, or a zigzag-shaped surface.

Each of the plurality of display apparatuses may include: a controller configured to control operations of the display panel; and an image processor configured to perform image correction.

The image processor may be configured to divide the image into a first image part corresponding to light emitted from the activated area and a second image part corresponding to the light emitted from the bending area and configured to change a pixel size of the second image part.

The image processor may be configured to adjust the pixel size of the second image part to increase in a direct proportion to a corresponding distance from a bending point to a corresponding pixel, and configured to adjust a pixel size of the first image part to decrease according to a size of the image and a degree of the pixel size increase of the second image part.

Display attributes of the plurality of display apparatuses may be configured to be adjusted to match display attributes of a reference display apparatus.

The display attributes comprise at least one of color temperature, pixel resolution, chromaticity, chroma, and contrast.

Each of the plurality of display apparatuses may further include a plurality of sensors disposed on an edge of the display panel, and the plurality of sensors are configured to sense display attributes of peripheral display apparatuses and each display apparatus is configured to adjust display attributes of each display apparatus according to a result of the sensing.

The apparatus may further include: a host device configured to communicate with the plurality of display apparatuses, wherein the host device includes: an image processor configured to correct each of partial images displayed on each of the plurality of display apparatuses; and a controller configured to send each of the partial images corrected in the image processor to a corresponding display panel of the plurality of display apparatuses.

According to an aspect of another exemplary embodiment, there is provided a tiled display apparatus including: a casing; a plurality of display panels supported by the casing and configured to display a continuous image, each display panel including: an activated area configured to display a first image portion of the continuous image; and at least one bending area bent from the activated area toward the casing and configured to display a second image portion of the continuous image; and a controller configured to control operations of each display panel, wherein the controller is configured to correct the second image portion of the continuous image corresponding to light emitted from the at least one bending area.

The apparatus may further include an optical member provided on the at least one bending area, the optical member configured to refract the light emitted from the bending area.

The controller may correct the second image portion of the continuous image corresponding to the light emitted from the at least one bending area according to a ratio between an image size displayed on the display panel in a flat state and an image size displayed on the display panel in a bent state.

The ratio may be calculated by the following formula:

$$\text{Ratio} = \frac{L + 2\frac{S}{\theta_S}\cos\left(\frac{\Pi}{2} - \theta_S\right)}{L + 2S}$$

where L denotes a length of the activated area, S denotes a length of the at least one bending area and $\theta_S$ denotes a bent angle of the at least one bending area at the bent state measured from a bending point corresponding to an end of the activated area.

The controller may be configured to change a pixel size of the second image portion according to the ratio.

The controller may be configured to adjust the pixel size of the second image portion to increase in a direct proportion to a corresponding distance from the bending point to a corresponding pixel, and configured to adjust a pixel size of the first image portion to decrease according to a size of the continuous image and a degree of the pixel size increase of the at least one bending area.

According to an aspect of another exemplary embodiment, there is provided a method for compensating images, the method including: providing a display panel including a flat area displaying a first image part of a continuous image and a bending area displaying a second image part of the continuous image; compensating the second image part; and outputting the continuous image including the first image part and the corrected second image part on the display panel.

The compensating the second image part may include correcting the second image part of the continuous image according to a ratio between an image size displayed on the display panel in a flat state and an image size displayed on the display panel in a bent state.

The method may further include providing an optical member on the bending area, the optical member configured to refract the light emitted from the bending area.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
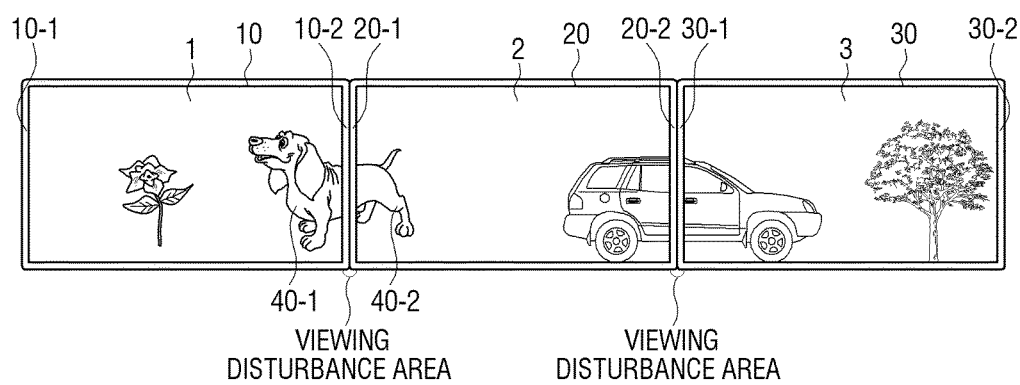
FIG. 1 is a view illustrating a tiled display system of the related art.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 2:
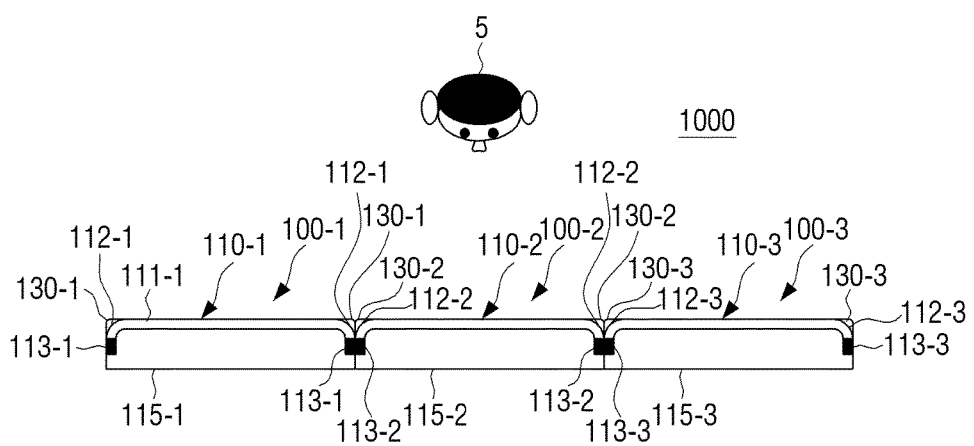
FIG. 2 is a schematic view illustrating a tiled display system according to an exemplary embodiment.

FIG. 2 is a schematic view illustrating a tiled display system according to an exemplary embodiment.

According to FIG. 2, a tiled display system 1000 includes a plurality of display apparatuses 100-1, 100-2, 100-3 and a plurality of optical members 130-1, 130-2, 130-3. FIG. 2 illustrates the tiled display system 1000 including the first, second and third display apparatuses 100-1, 100-2, 100-3 arranged side by side for the convenience of explanation, but the alignment and the number of the display apparatuses are not limited thereto. For example, the display apparatuses may be realized with two or more display apparatuses, and in case of at least four, the display apparatuses may be arranged as a matrix shape having a plurality of rows and columns.

The plurality of display apparatuses 100-1, 100-2, 100-3 include respective display panels 110-1, 110-2, 110-3 and respective cases 115-1, 115-2, 115-3. The cases 115-1, 115-2, 115-3 are the configurations to support the respective display panels 110-1, 110-2, 110-3 and configured to protect a back surface of the respective display panels 110-1, 110-2, 110-3. In the cases 115-1, 115-2, 115-3, various electronic parts which are used for the display apparatuses 100-1, 100-2, 100-3 can be mounted. For example, various elements such as an image processor, a controller, a memory, a power conversion unit, and a communication interface can be mounted.

The display panels 110-1, 110-2, 110-3 include activated areas 111-1, 111-2, 111-3 and inactivated areas 113-1, 113-2, 113-3. The activated areas 111-1, 111-2, 111-3 indicate areas where an image is displayed, and the inactivated areas 113-1, 113-2, 113-3 indicate areas where an image is not displayed. Alternatively, the activated areas 111-1, 111-2, 111-3 may be designated as a main area, a central area, or a display area, and the inactivated areas 113-1, 113-2, 113-3 may be designated as a sub area, an edge area, or the bezel.

The inactivated areas 113-1, 113-2, 113-3 are located at edges of the activated areas 111-1, 111-2, 111-3. The inactivated areas 113-1, 113-2, 113-3 are bent in a back direction, that is, toward the respective cases 115-1, 115-2, 115-3. A bending angle of the inactivated areas 113-1, 113-2, 113-3 from the activated areas 111-1, 111-2, 111-3 may be about 90 degrees, but is not limited thereto. By bending, the inactivated areas 113-1, 113-2, 113-3 form an angle (θ) of 90 degrees from a flat part of the display panels 110-1, 110-2, 110-3, that is, the activated areas 111-1, 111-2, 111-3. The connection area among the display apparatuses is illustrated in FIG. 3 in further detail.

Figure 3:
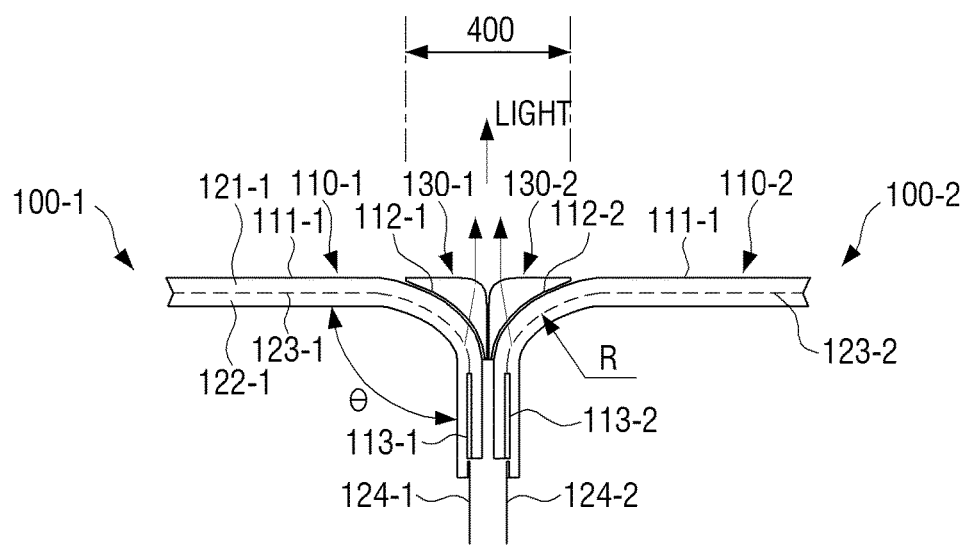
FIG. 3 is an enlarged partial cross-sectional view illustrating a connection area of two adjacent display apparatuses of the tiled display apparatus of FIG. 2.

FIG. 3 illustrates a connection area 400 between the first and the second display apparatuses 100-1, 100-2, but the connection area 400 between the second and the third display apparatuses 100-2, 100-3 may be realized in the same manner. Further, the configuration of each display apparatus 100-1, 100-2, 100-3 may be realized in the same manner, and thus, the configurations of the first display apparatus 100-1 will be explained.

According to FIG. 3, the display panel 110-1 includes an upper substrate 121-1, a lower substrate 122-1, a pixel layer 123-1, an inactivated area 113-1, a bending area 112-1, and a circuit substrate 124-1.

The upper substrate 121-1 and the lower substrate 122-1 are formed as size which can cover both the pixel layer 123-1 and the inactivated area 113-1, and the upper substrate 121-1 is installed on a front surface of the pixel layer 123-1 and the inactivated area 113-1, and the lower substrate 122-1 is attached to a back surface of the pixel layer 123-1 and the inactivated area 113-1. In order to keep the inactivated area 113-1 from being seen from the front of the display panel 110-1, the inactivated area 113-1 is bent from the activated area 111-1 by about 90 degrees towards the case 115-1, and a part of the pixel layer 123-1 which is connected to the inactivated area 113-1 is bent with a specific curvature (R). A bending area 112-1 indicates an area of the display panel 110-1 where the pixel layer 123-1 adjacent to the inactivated area 113-1 is bent. a part of the pixel layer 123-1 is included in the bending area 112-1, and thus, the bending area 112-1 is an activated area. Therefore, an image may be displayed on the bending area 112-1. The display panel 110-1 has four (4) sides, and thus, one display panel 110-1 includes four (4) bending areas on top, bottom, left and right sides of the display panel 110-1.

The inactivated areas 113-1, 113-2 are bent from the activated areas 111-1, 111-2 at 90 degrees toward the respective cases 115-1, 115-2, and thus, the inactivated areas 113-1, 113-2 of the adjacent first and second display panels 110-1, 110-2 face each other. Accordingly, the inactivated area 113-1 which is seen by a viewer 5 who is positioned in the front of the tiled display system 1000 corresponds to thickness of the upper substrate 121-1 of the display panel 110-1. Similarly, the inactivated area 113-2 which is seen by a viewer 5 who is positioned in the front of the tiled display system 1000 corresponds to thickness of the upper substrate 121-2 of the display panel 110-2. Therefore, thickness of viewing disturbance area in which an image is not displayed on a connection area 400 between the first and the second display apparatuses 100-1, 100-2 is about two times of that of the upper substrate 121-1 or about two times of that of the upper substrate 121-2. For example, in case of the display panel 110-1 of which thickness of the upper substrate 121-1, 121-2 is 1 mm, thickness of an area where an image is not displayed on the tiled display system 1000 is approximately 2 mm.

When the inactivated area 113-1 is bent from the activated area 111-1 of the display panel 110-1 by about 90 degrees, the viewer 5 may view a distorted image or a disconnected image at the connection area 400 between the two adjacent display apparatuses 100-1, 100-2.

Figure 4:
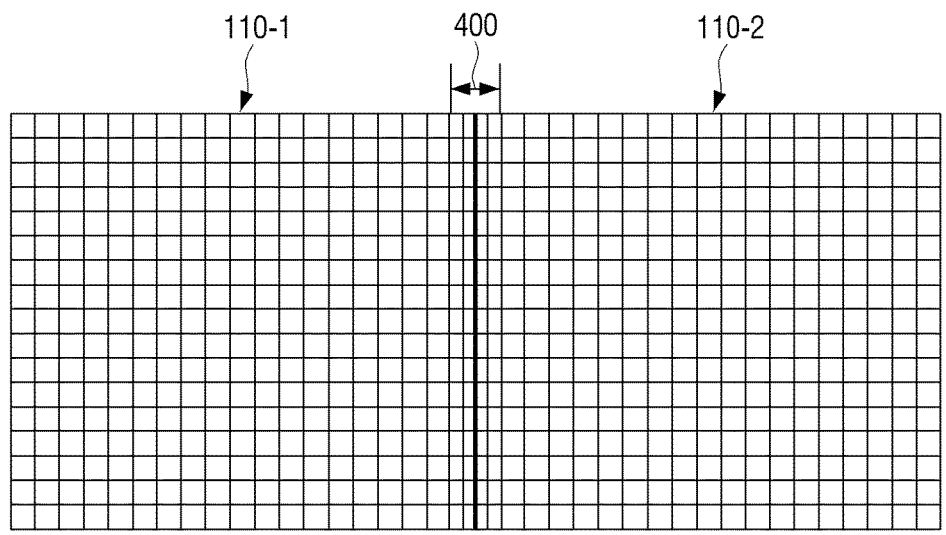
FIG. 4 is a view illustrating a distortion of an image which occurs at bending areas of two adjacent display apparatuses of the tiled display system.

FIG. 4 is a view to explain image distortion in a connection area 400. As illustrated in FIG. 4, the inactivated area 113-1 illustrated in FIG. 3 is present in the connection area 400, and thus, the image in this area looks darker than an image in other areas. In addition, in case of most of the display system, light emitted from each pixel has Lambertian distribution which follows Lambert's cosine law, and thus, as to light from the bent area, light which is emitted to vertical direction of the bent area is more than light emitted toward viewers in a front side. Accordingly, quantity of light emitted to the front side is decreased, and thus, distorted image is present, that is, the connection area 400 looks darker than other areas to a front viewer, and the connection area 400 looks brighter than to a side viewer. Consequently, when a user wishes to view one large image using a plurality of display panels 110-1, 110-2, the user may regard as if an image provided between the display panels 110-1, 110-2 is cut in the connection area 400. In order to minimize such viewing disturbance, in the tiled display system 1000 according to an exemplary embodiment, an optical member 130-1 and an optical member 130-2 are disposed on the connection area 400.

The optical member 130-1 is an element to make light of an image output to the bending area 112-1 of the display panel 110-1 to be bent and penetrated so that the light may be directed toward the eyes of the viewer 5 in a front direction. The optical member 130-1 may reduce distortion or darkness of an image of the bending area 112-1. The optical member 130-1 is installed along the bending area 112-1 of the display panel 110-1, and makes the image output from the bending area 112-1, that is, light from the pixel layer 123-1 of the bending area 112-1 may be penetrated. The optical member 130-1 may be attached to a surface of the bending area 112-1 of the display panel 110-1 or may be positioned apart from the surface of the bending areas by a predetermined distance.

Figure 5:
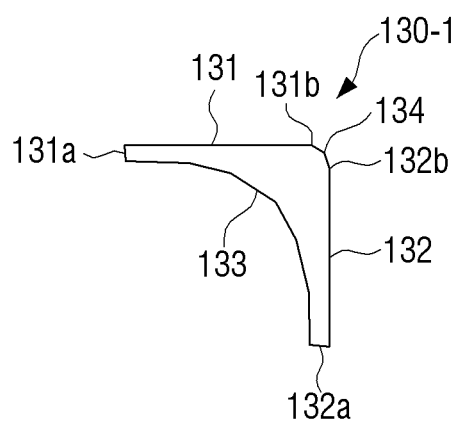
FIG. 5 is a sectional view illustrating an example of an optical member of the tiled display system of FIG. 3 according to an exemplary embodiment.

An example of the optical member 130-1 is illustrated in FIG. 5. FIG. 5 is a sectional view illustrating an example of the optical member 130-1 may be used in the tiled display system 1000 of FIG. 3 according to an exemplary embodiment. The optical member 130-1 illustrated in FIG. 5 is positioned along the bending area 112-1 of the first display apparatus 100-1, and another optical member 130-2 with a bilaterally symmetrical structure is positioned in the left bending area 112-2 of the second display apparatus 100-1, and the connection area 400 is filled (See FIG. 3) with the optical members 130-1, 130-2. For convenience of explanation, the optical member 130-2 which is positioned on the second display apparatus 100-1 will not be illustrated and explained.

Referring to FIGS. 3 and 5, the optical member 130-1 may include a first plane 131 which extends parallel with the activated area 111-1 of the display panel 110-1, a second plane 132 which is orthogonal to the first plane 131 and extends parallel with the inactivated area 113-1 of the display panel 110-1, a first curved surface 133 which connects a back end 131a of the first plane 131 and a back end 132a of the second plane 132, and receives an image from the bending area 112-1 of the display panel 110-1, and the second curved surface 134 which faces the first curved surface 133, connects a front end 131b of the first plane 131 and a front end 132b of the second plane 132, and has a radius of curvature smaller than that of the first curved surface 133. The optical member 130-1 may have the aforementioned shape and may be formed with a length of a side of the display panel 110-1, that is, may be formed with a height length.

For example, when the optical member 130-1 is used for the bending area 112-1 on a right side of the first display panel 110-1, the optical member 130-1 is formed to have a length which corresponds to length of the right side of the display panel 110-1. In addition, the front ends 131b, 132b of the first plane 131 and the second plane 132 indicates ends which are most adjacent to the first plane 131 and the second plane 132 which are placed to be orthogonal to each other, and the back ends 131a, 132a of the first plane 131 and the second plane 132 indicate the ends which are located farthest from the front ends 131b, 132b.

The optical member 130-1 is formed such that light emitted from the bending area 112-1 of the display panel 110-1 is emitted through the first plane 131. The second curved surface 132 may be formed so as to have the smallest possible radius of curvature. The optical member 130-1 plays a role as a lens and makes the radius of curvature of the display panel 110-1 looks smaller than actual radius of curvature (R). While the radius of curvature (R) became smaller, the connection area 400 looks smaller than actual size. To be specific, by the refraction ratio of the first plane 131 of the optical member 130-1, position of pixels in the bending area 112-1 of the display panel 110-1 look closer to the activated area 111-1 of the display panel 110-1. As a result, image distortion and lighting distortion of the bending area 112-1 may be reduced. The higher the transparency of the material which forms the optical member 130-1 is, the better the optical member 130-1 may correct image distortion and lighting distortion. The optical member 130-1 may be formed as transparent glass or plastic.

Shape of the optical member 130-1 is not limited as the shape illustrated in FIG. 5. As described above, the optical member 130-1 which will be positioned in the left bending area 112-2 of the display panel 110-2 of the display apparatus 100-2 may be realized as bilaterally symmetrical structure as illustrated in FIG. 5. In addition, as long as image distortion and lighting distortion can be corrected, the optical member 130-1 may have diverse shapes.

Figure 6:
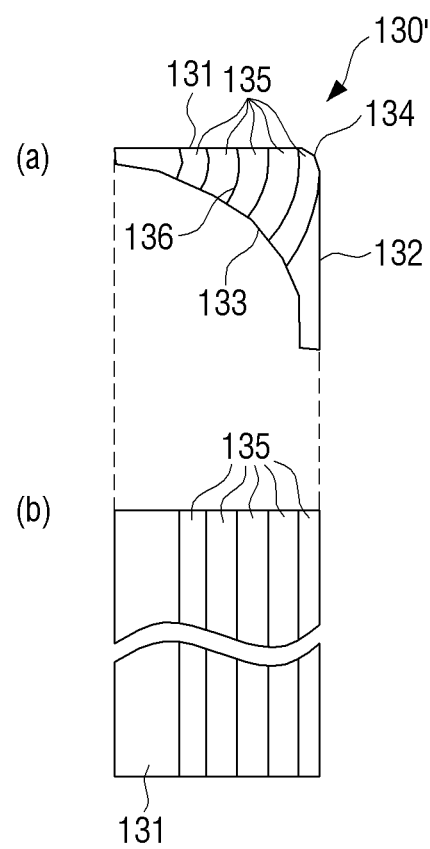
FIG. 6 is views illustrating another example of an optical member of the tiled display system of FIG. 3 according to an exemplary embodiment.

FIG. 6 is illustrates an example of the optical member 130' which is usable for the tiled display system 1000 of FIG. 3. Herein, view (a) in FIG. 6 is a sectional view on a horizontal plane, and view (b) in FIG. 6 is a frontal view. The optical member 130' may replace the optical member 130-1 shown in FIG. 3.

Referring to FIG. 6, the optical member 130' is positioned on the bending area in the same manner as the abovementioned optical member 130-1 shown in FIG. 3. The optical member 130' according to the exemplary embodiment may include the first plane 131 which is parallel to the activated area 111-1 of the display panel 110-1, the second plane 132 which is orthogonal to the first plane 131 and parallel to the inactivated area 113 of the display panel 110, the first curved surface 133 which connects a back end of the first plane 131 and a back end of the second plane 132, and receives an image from the bending area 112-1 of the display panel 110-1, and the second curved surface 134 which faces the first curved surface 133, connects a front end of the first plane 131 and a front end of the second plane 132, and has a radius of curvature smaller than that of the first curved surface 133. In the optical member 130' according to the exemplary embodiment, a plurality of light guide layers 135 which guide light from the bending area 112-1 of the display panel 110-1 to the first side surface 131 are formed, and this feature is different from the optical member 130-1 of FIGS. 3 and 5. Referring to FIG. 6A which is a sectional view, five (5) photo guide layers 135 are in a bent shape from the bending area 112-1 toward a front surface, and make light emitted from the bending area 112-1 refracted to a front surface. A plurality of photo guide layers 135 are formed side by side in a vertical length direction of the optical member 130-1, and the boundary surface 136 of a plurality of photo guide layers 135 are formed as a mirror to reflect entered light.

Figure 7:
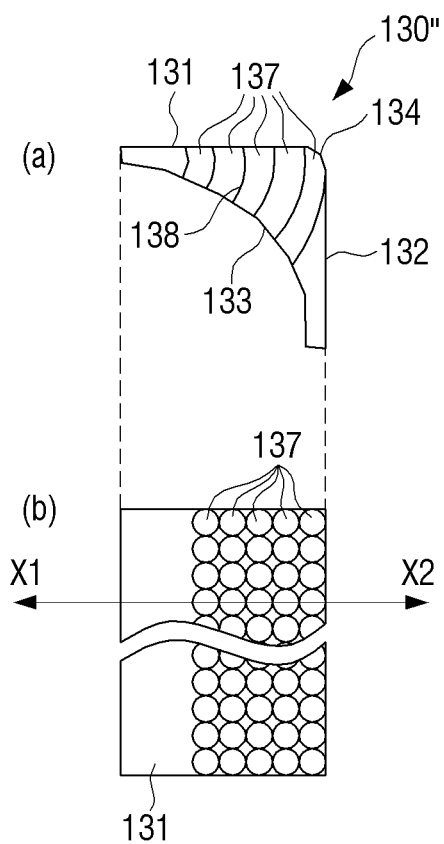
FIG. 7 is views illustrating yet another example of an optical member of the tiled display system of FIG. 3 according to an exemplary embodiment.

FIG. 7 illustrates still another example of an optical member of the tiled display system of FIG. 3. View (a) in FIG. 7 is a sectional view of the optical member 130", and view (b) in FIG. 7 is a frontal view. View (a) in FIG. 7 corresponds to a cross-section cut along X1-X2 direction of the optical member 130" of view (b) of FIG. 7. Referring to FIG. 7, the optical member 130" may include a first plane 131 which is parallel to the activated area 111-1 of the display panel 110-1, a second plane 132 which is orthogonal to the first plane 131 and parallel to the inactivated area 113-1 of the display panel 110-1, a first curved surface 133 which connects a back end of the first plane 131 and a back end of the second plane 132, and receives an image from the bending area 112-1 of the display panel 110-1, and a second curved surface 134 which faces the first curved surface 133, connects a front end of the first plane 131 and a front end of the second plane 132, and has a radius of curvature smaller than that of the first curved surface 133. In case of the optical member 130" according to the exemplary embodiment, between the first curved surface 133 and the first plane 131, a plurality of photo guide poles 137 which guide light from the bending area 112-1 of the display panel 110-1 to the first plane 131 are formed, and this feature is distinct over the optical member 130' of FIGS. 3, 5 and 6. The plurality of light guide layers 137 may be in cylindrical shape or other may-sided cylinder shape, and the inner side 138 of each photo guide pole 137 is formed as a mirror surface to reflect entered light.

Each of the optical members described in FIGS. 5, 6 and 7 have a shape to cover one bending area. That is, in order to cover one connection area, two optical members of the optical members described in FIGS. 5, 6 and 7 that are bilaterally symmetrical to each other may be used. On the other hand, the optical member may be designed so that one connection area may be filled with only one optical member.

Figure 8:
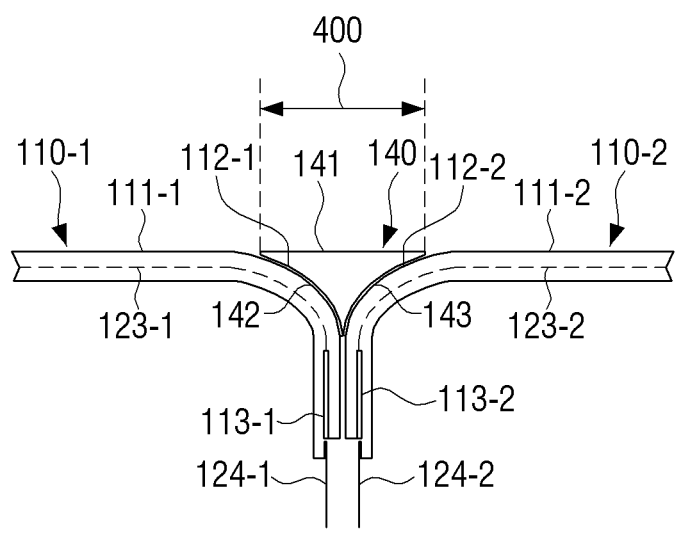
FIG. 8 is an enlarged view illustrating a connection area of two adjacent display apparatuses of the tiled display system according to an exemplary embodiment.
Figure 9:
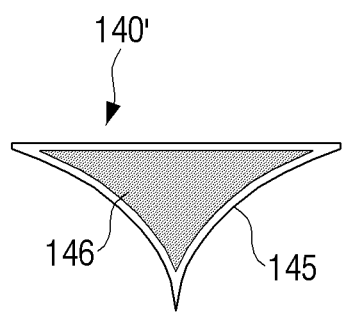
FIG. 9 is a sectional view illustrating another example of an optical member of the tiled display system of FIG. 8 according to an exemplary embodiment.

FIG. 8 is a view which illustrates an optical member of two adjacent display apparatuses of the tiled display system according to an exemplary embodiment, and FIG. 9 is a sectional view illustrating the enlarged optical member of the tiled display system of FIG. 8.

Referring to FIG. 8, the optical member 140 having a prism shape and extending in a vertical direction may cover the connection area 400 between two adjacent display apparatuses 100-1, 100-2. That is, the optical members 130-1, 130', 130" of the aforementioned exemplary embodiments are formed such that the bending areas 112-1, 112-2, 112-3 of each display panel 110-1, 110-2, 110-3 can be covered individually, but the optical member 140 according to the exemplary embodiment may be installed in a notch which is a concave part formed by the bending areas 112-1, 112-2, 112-3 of the adjacent display panels 110-1, 110-2, 110-2 and 110-3. Accordingly, the optical members 130-1, 130', 130" by the aforementioned exemplary embodiment may be attached prior to connecting each display apparatus 100-1, 100-2, 100-3, but the optical member 140 of the exemplary embodiment may be installed at each connection area, after all the plurality of display apparatuses 100-1, 100-2, 100-3 are connected.

The optical member 140 having the prism shape according to the exemplary embodiment includes the front surface 141 which is parallel to the activated areas 111-1, 111-2 of the display panels 110-1, 110-2, and the first curved surface 142 and the second curved surface 143 which respectively correspond to the bending areas 112-1, 112-2 of two adjacent display panels 110-1, 110-2. The optical member 140 is formed as transparent material having refraction rate of n, and thus, the pixel layer 123 of the bending areas 112-1, 112-2 of the two adjacent display panels 110-1, 110-2 looks closer to the flat front surface 141. Therefore, image distortion which takes place at the bending areas 112-1, 112-2 of the two adjacent display panels 110-1, 110-2 may be reduced.

FIG. 9 illustrates an optical member 140' according to an exemplary embodiment which may be used for two adjacent display apparatuses of the tiled display system 1000 of FIG. 8. The optical member 140' of FIG. 9 may be made from a transparent housing 145 and transparent liquid 146 which is filled in the transparent housing 145. The transparent housing 145 is formed with shape which corresponds to a notch formed by the bending areas 112-1, 112-2 of the two adjacent display panels 110-1, 110-2 as shown in FIG. 8. The optical member 140' of FIG. 9 is the same as the optical member 140 of FIG. 8 except that the optical member 140' is formed using the transparent liquid 146, and thus, detailed explanation will be omitted.

Alternatively, as another example of the optical member, Gabor superlens may be used. In other words, the Gabor superlens may be installed in the bending areas 112-1, 112-2 of the two adjacent display panels 110-1, 110-2, and image distortion in the connection area may be decreased.

Figure 10:
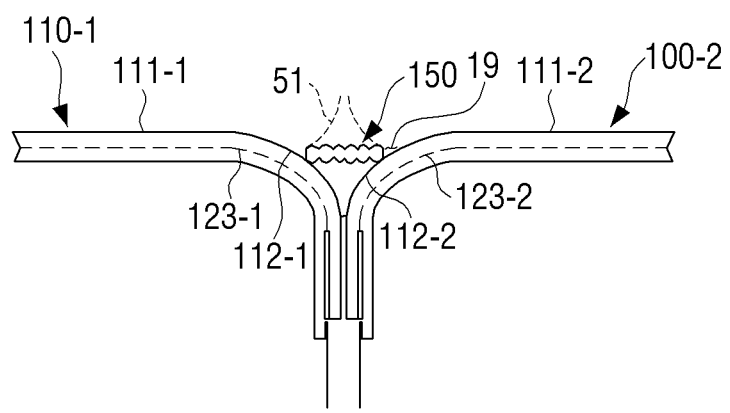
FIG. 10 is an enlarged view illustrating a connection area of two adjacent display apparatuses of the tiled display system according to another exemplary embodiment.

FIG. 10 is a view to explain an exemplary embodiment of using the Gabor superlens as an optical member. According to FIG. 10, the Gabor superlens 150 is formed as two confocal lens arrays. For example, the Gabor superlens 150 may be formed as two lenticular lens arrays. Different from ordinary lenses, the Gabor superlens 150 forms a real image of an object at a certain distance which is proportionally distant to the object. In FIG. 10, the real image 51 of the pixel layers 123-1, 123-2 of the bending areas 112-1, 112-2 is present in dotted lines. Therefore, when the Gabor superlens 150 is positioned in the groove 19 formed on the connection area between interconnected two display apparatuses 100-1, 100-2, the pixel layers 123-1, 123-2 of the bending areas 112-1, 112-2 below the Gabor superlens 150 look as if being located on the Gabor superlens 150 as the dotted line 51. Accordingly, an image of the bending area at the connection areas of two display apparatuses 100-1, 100-2 looks natural. Consequently, a viewing zone is further expanded.

FIG. 10 illustrates the Gabor superlens 150 in flat shape, but the Gabor superlens may be realized as a bent shape.

Figure 11:
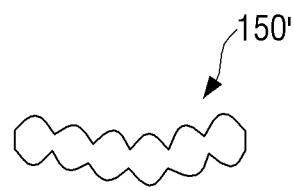
FIG. 11 is a sectional view which schematically illustrates a bent Gabor super lens which is used for the tiled display system of FIG. 10.

FIG. 11 is a view illustrating still another exemplary embodiment of the optical member. According to FIG. 11, a Gabor superlens 150' with a concave curve may be used as an optical member. Accordingly, the effect to soften the connection area may be further improved.

Returning to FIG. 3, a circuit substrate 124-1 is an element where various components disposed inside the case 115-1 are positioned. For example, if each of display apparatus 100-1, 100-2, 100-3 includes elements such as an image processor, a controller, and a memory, these elements may be controlled to be electrically connected through the circuit substrate 124-1 of the display apparatus 100-1 and an image is output from the pixel layer 123-1 of the display apparatus 100-1. The circuit substrate 124-1 may be realized as flexible material, but is not limited thereto. The circuit substrate 124-1 may be connected with the pixel layer 123-1 through inside of the inactivated area 113-1.

In the aforementioned exemplary embodiments, each display apparatus 100-1, 100-2, 100-3 uses an optical member 130-1, 130-2, 130-3 so that an image displayed on a bending area may be viewed by a viewer 5. In this case, so that an image of the connection area may be viewed without any unnecessary disturbances, at least a part of an image may be corrected by each display apparatus 100-1, 100-2, 100-3. In addition, each display apparatus 100-1, 100-2, 100-3 may have different display attributes such as color, chroma, brightness, contrast, and resolution. In this case, the viewer 5 may have a difficulty in realizing that images displayed in each display apparatus 100-1, 100-2, 100-3 form one large continuous image. Accordingly, adjustment may be performed for the display attributes. A method for image correction and adjusting display attributes will be further detailed below.

The tiled display system 1000 according to various exemplary embodiments may provide a seamless display in which connection areas 400 among the display apparatuses may not be viewed by an optical member.

In FIG. 2, the tiled display system 1000 is configured to form such that a plurality of display apparatuses 100-1, 100-2, 100-3 constitute one continuous plane, but the system is not limited thereto. In other words, a plurality of display apparatuses which constitute the tiled display system 1000 may be disposed to be convex, concave, or zigzag shape.

Figure 12:
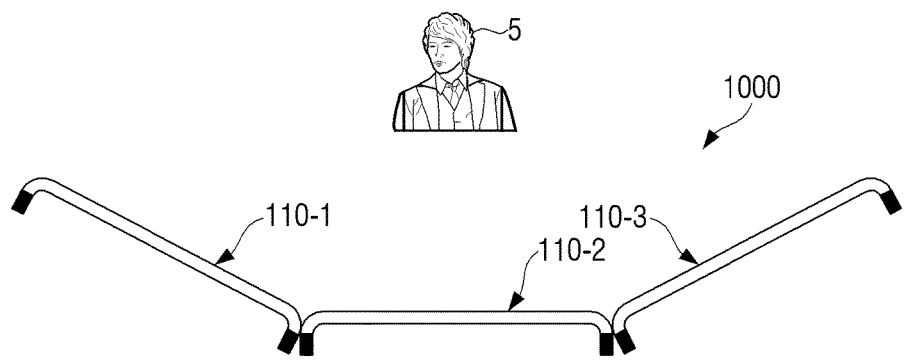
FIGS. 12-14 are views illustrating examples of various arrangement patterns of a plurality of display apparatuses of the tiled display system.
Figure 13:
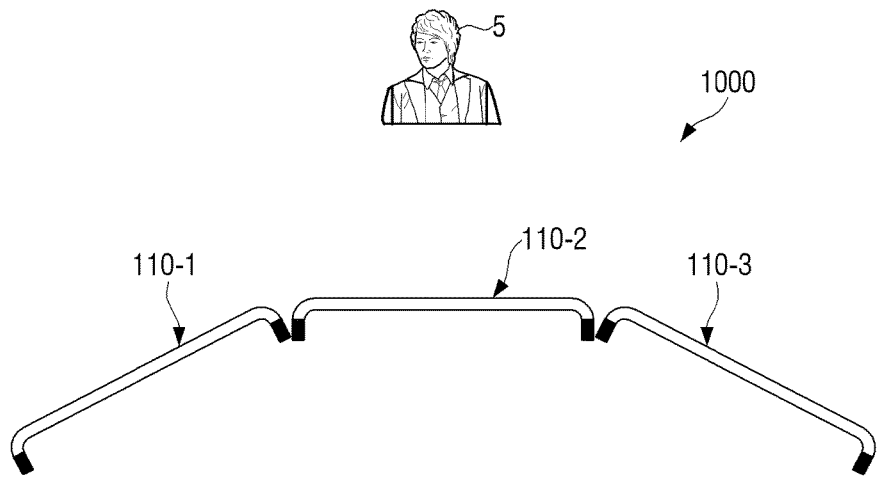
Figure 14:
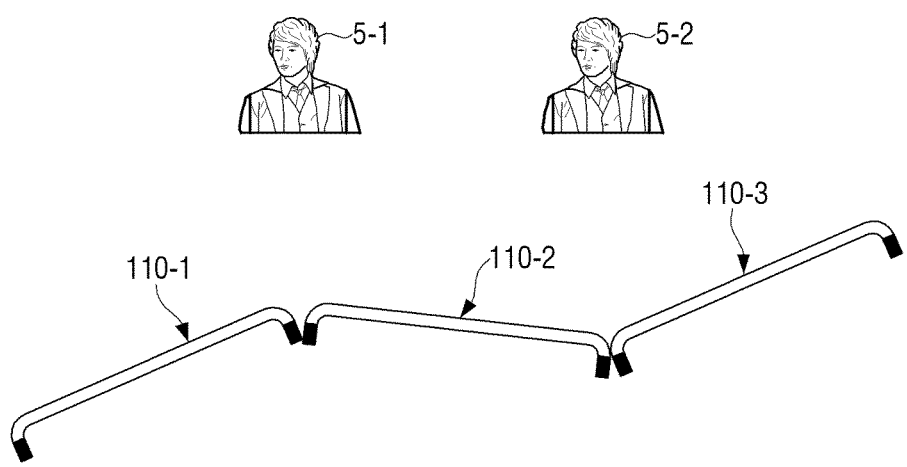

FIGS. 12, 13 and 14 illustrate various examples of arrangement type of the tiled display system 1000. According to FIG. 12, the tiled display system 1000 may be arranged so that a plurality of display apparatuses 100-1, 100-2, 100-3, with respect to the position of the viewer 5, form one concave curved surface.

According to FIG. 13, the tiled display system 1000 may be arranged, with respect to the position of the viewer 5, so that a plurality of display apparatus 100-1, 100-2, 100-3 form one convex curved surface.

Alternatively, as illustrated in FIG. 14, the tiled display system 1000 may be formed so that a plurality of display apparatuses 100-1, 100-2, 100-3 form zigzag or wave. If the tiled display system 1000 are arranged as FIG. 14, one viewer 5-1 may view an image with a convex surface, while another viewer 5-2 may view an image with a concave surface.

Though not illustrated, a plurality of display apparatuses 100-1, 100-2, 100-3 of the tiled display system 1000 may be arranged to form various types of curved surface. For reference, FIGS. 12-14 only illustrate the display panels 110-1, 110-2, 110-3, but omit cases supporting the respective display panels 110-1, 110-2, 110-3.

As FIGS. 12-14, when each display apparatus is not connected with each other in a straight line, but is connected while being tilted in a certain angle from each other, shape of an optical member formed on the connection area 400 may be changed. For example, in FIGS. 5, 6 and 7, the first plane 131 and the second plane 132 of the optical member are in orthogonally arranged with respect to each other, but when each display apparatus is not connected with each other in a straight line as illustrated in FIGS. 12-14, an optical member having a transformed structure may be used so that the first plane 131 and the second plane 132 form an obtuse angle or an acute angle.

In the above, it has been explained that each display panel 110-1, 110-2, 110-3 in the tiled display system 1000 has a flat/planar surface, but it is not always limited to each of the display panel 110-1, 110-2, 110-3 having the flat surface. Therefore, the tiled display system 1000 may be configured using a plurality of display apparatuses having concave or convex display panels.

Figure 15:
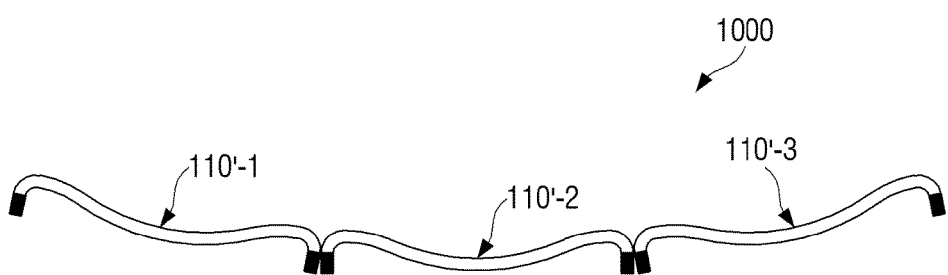
FIGS. 15-17 are views illustrating various examples of the tiled display system including a plurality of display apparatuses having a curved display panel.
Figure 16:
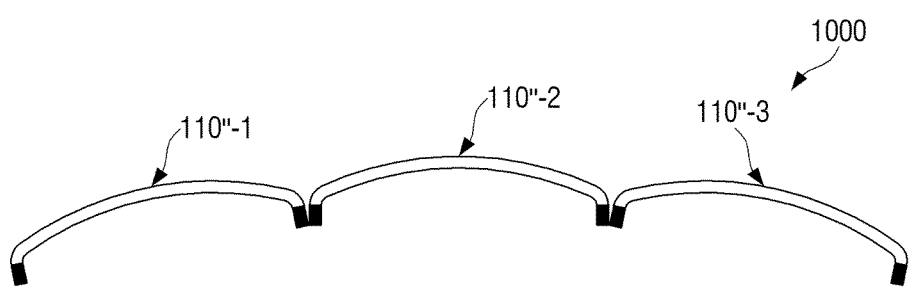

FIG. 15 illustrates the tiled display apparatus 1000 which connects display apparatuses with each display panel 110-1, 110-2, 110-3 having a concave curved surface, and FIG. 16 illustrates the tiled display apparatus 1000 which connects display apparatuses with each display panel 110-1, 110-2, 110-3 having a convex curved surface.

Figure 17:
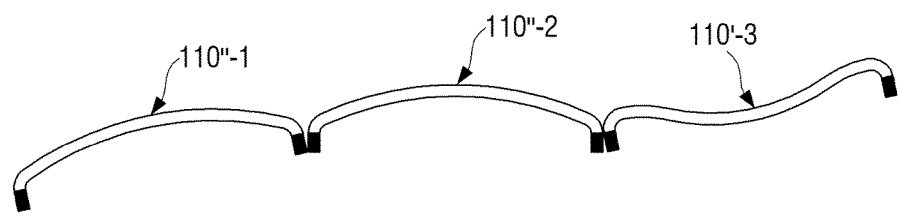

In addition, FIG. 17 illustrates the tiled display apparatus 1000 which connects two display apparatuses with display panels 110-1, 110-2 each having a convex curved surface, and one display apparatus with a display panel 110-3 having a concave curved surface. Shapes and arrangement positions of a display panel may be changed variously.

In the above, the case according to an exemplary embodiment including a display panel 110-1, 110-2, 110-3 where an external shape of the activated area 111-1, 111-2, 111-3 is not changed after the inactivated area 113-1, 113-2, 113-3 is bent by 90 degrees in the manufacturing process is used has been explained. However, the display panel 110-1, 110-2, 110-3 may use a flexible display panel which may freely change shape.

Figure 18:
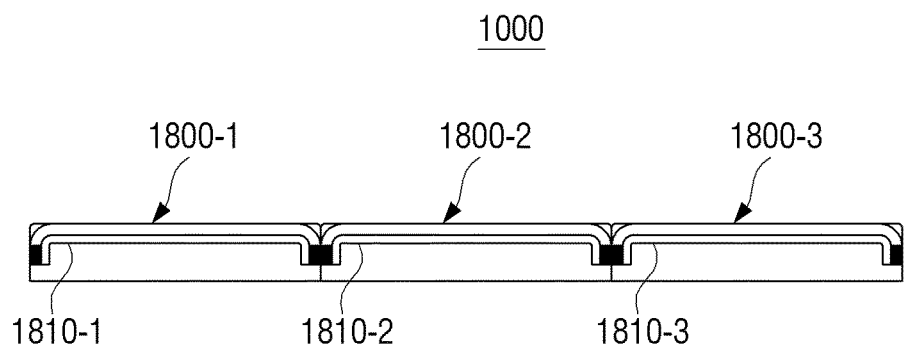
FIG. 18 is a view which schematically illustrates an example of the tiled display system having a plurality of flexible panels.

FIG. 18 is a view illustrating an example of the tiled display system 1000 which uses a flexible display panel. In FIG. 18, flexible display panels 1800-1, 1800-2, 1800-3 may include a flexible liquid crystal display (LCD) panel, a flexible electro luminescence (EL) panel, and a flexible organic light emitting diode (OLED) panel. Shapes of the flexible display panels 1800-1, 1800-2, 1800-3 may be changed, if external power is applied from outside, and thus, as illustrated in FIG. 18, supporting frames 1810-1, 1810-2, 1810-3 which may maintain respective curvatures of the flexible display panels 1800-1, 1800-2, 1800-3 which are bent with required curvature may be necessary. The support frames 1810-1, 1810-2, 1810-3 may be installed inside a case so as to support a back surface of the flexible display panels 1800-1, 1800-2, 1800-3. Configurations other than the above described flexible display panels are the same as those of the aforementioned tiled display system 1000, and thus, detailed explanation will be omitted.

The tiled display system 1000 based on the aforementioned exemplary embodiments may be applicable to video walls, multivision displays, panoramic home TV, mobile displays, and relevant fields.

Figure 19:
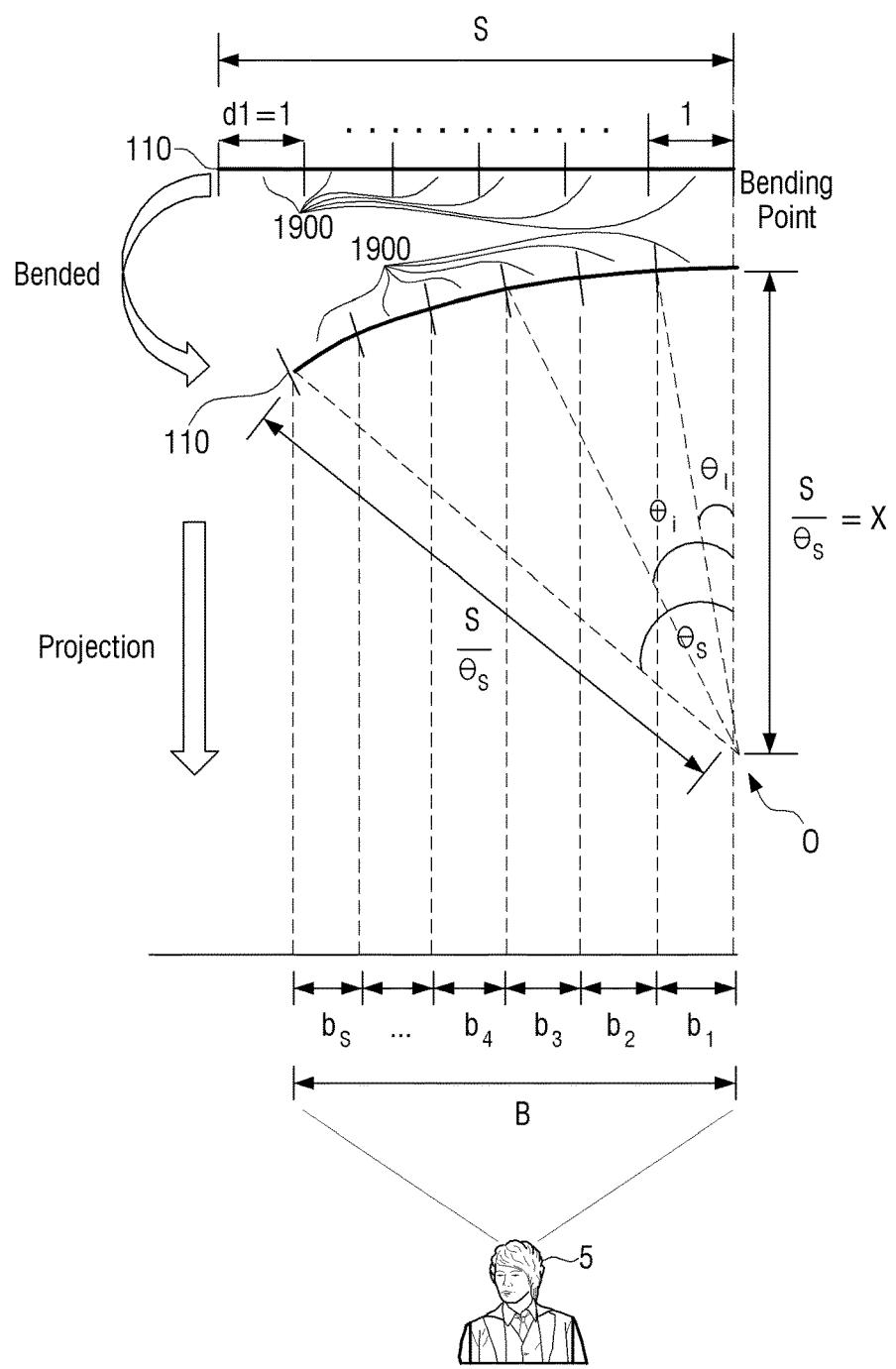
FIGS. 19 and 20 are views illustrating principles of image correction.
Figure 20:
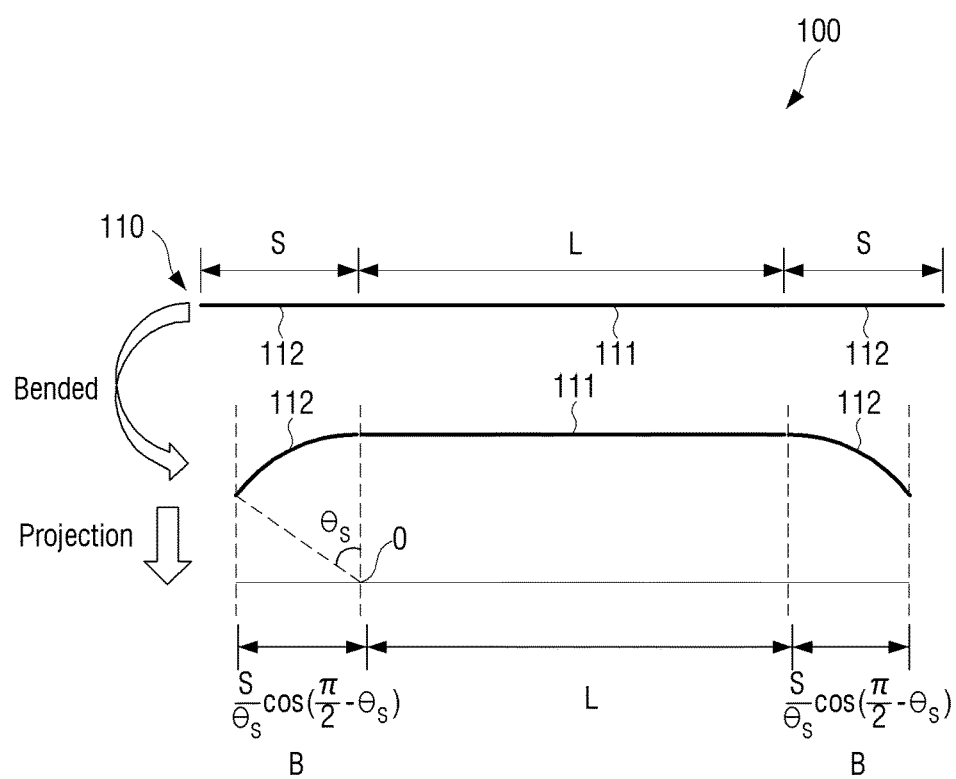

In the aforementioned various exemplary embodiments, the display panel includes a bending area (i.e. 112-1, 112-2 in FIG. 3), and thus, by the naked eyes of a viewer 5 who is positioned in the front side the display panel, pixels of a bending area look smaller than pixels of an activated area. FIGS. 19 and 20 are views to explain difference of pixel size between the bending area (i.e. 112-1, 112-2 in FIG. 3) and the activated area (i.e. 111-1, 111-2, 111-3 in FIG. 2).

Referring to FIG. 19, when a display panel 110 is divided with a plurality of block lines 1900, while the display panel 110 is flat, a width d1 of each of the block lines 1900 is the same. As illustrated in FIG. 19, when a plurality of display apparatuses are arranged side by side in a horizontal direction, the block lines 1900 may be vertical lines which are divided in horizontal direction, but when a plurality of display apparatuses are arranged side by side in a vertical direction, the block lines 1900 may be horizontal lines which are divided in vertical direction. In addition, in FIG. 19, for convenience of calculation, d1 is assumed to be 1, but each block line 1900 may be constituted as at least one pixel line. In FIG. 19, S indicates a width of a panel area which is used as a bending area from among the entire display panel 110.

In this state, when the display panel 110 is bent toward one side from a bending point, curvature is formed with a certain point (O) as a starting point. Herein, if it is assumed that a bending angle of each block line from the starting point (O) is $\theta_i$, radius from the starting point (O) is x, $S=2\pi x^*(\theta_S/2\pi)$, and thus, x is $S/\theta_S$. Here, $\theta_S$ is $\pi/2$ or less.

In this bending state, when an image is output from a bended area, size of each block which the viewer 5 may feel with naked eyes is $b_1 \sim b_S$. Each of this may be calculated as shown in mathematical formula 1 below.

$$b1 = \frac{S}{\theta_S}\cos\left(\frac{\Pi}{2} - \theta_S \frac{1}{S}\right)$$
$$b2 = \frac{S}{\theta_S}\cos\left(\frac{\Pi}{2} - \theta_S \frac{2}{S}\right) - \frac{S}{\theta_S}\cos\left(\frac{\Pi}{2} - \theta_S \frac{1}{S}\right)$$
$$bi = \frac{S}{\theta_S}\cos\left(\frac{\Pi}{2} - \theta_S \frac{i}{S}\right) - \frac{S}{\theta_S}\cos\left(\frac{\Pi}{2} - \theta_S \frac{i-1}{S}\right)$$

[Mathematical formula 1]

Accordingly, the length (S) of a bending area of the original display panel 110 is considered as being reduced as a length (B) to the naked eyes of the viewer 5. The length (B) is a value which is a sum of the widths b1 through bS. The mathematical formula thereof is as shown in mathematical formula below.

$$B = b1 + b2 + \ldots + bS = \frac{S}{\theta_S}\cos\left(\frac{\Pi}{2} - \theta_S\right)$$

[Mathematical formula 2]

FIG. 20 is a view to explain a size of an activated area 111 and a bending area 112 in the display panel 110. According to FIG. 20, top/bottom and/or left/right edges of the activated area 111 are bending areas 112. When a width of the activated area 111 is L, and a size of the bending area 112 is S, a display size of the bending area 112 after bending is reduced as a width B which is calculated from mathematical formula 2. Accordingly, a ratio between an image size displayed on the display panel 110 in a flat state and an image size displayed on the display panel 110 after the bending is as shown in mathematical formula 3 below.

$$\text{Ratio} = \frac{L + 2\frac{S}{\theta_S}\cos\left(\frac{\Pi}{2} - \theta_S\right)}{L + 2S}$$

[Mathematical formula 3]

As described above, the display size of the bending area 112 becomes smaller than the activated area 111 in the naked eyes of a user. Accordingly, each display apparatus 100 constituting the tiled display system 1000 may correct an image in the bending area 112 so that a viewer 5 may not feel awkward in a connection area.

Figure 21:
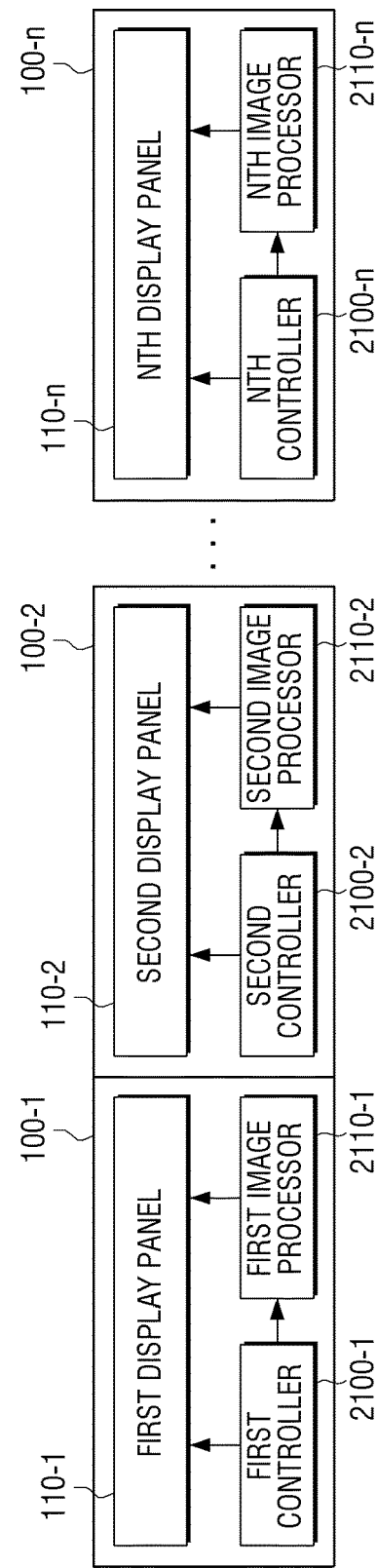
FIGS. 21-23 are block diagrams illustrating the configuration of the tiled display apparatus according to various exemplary embodiments.
Figure 22:
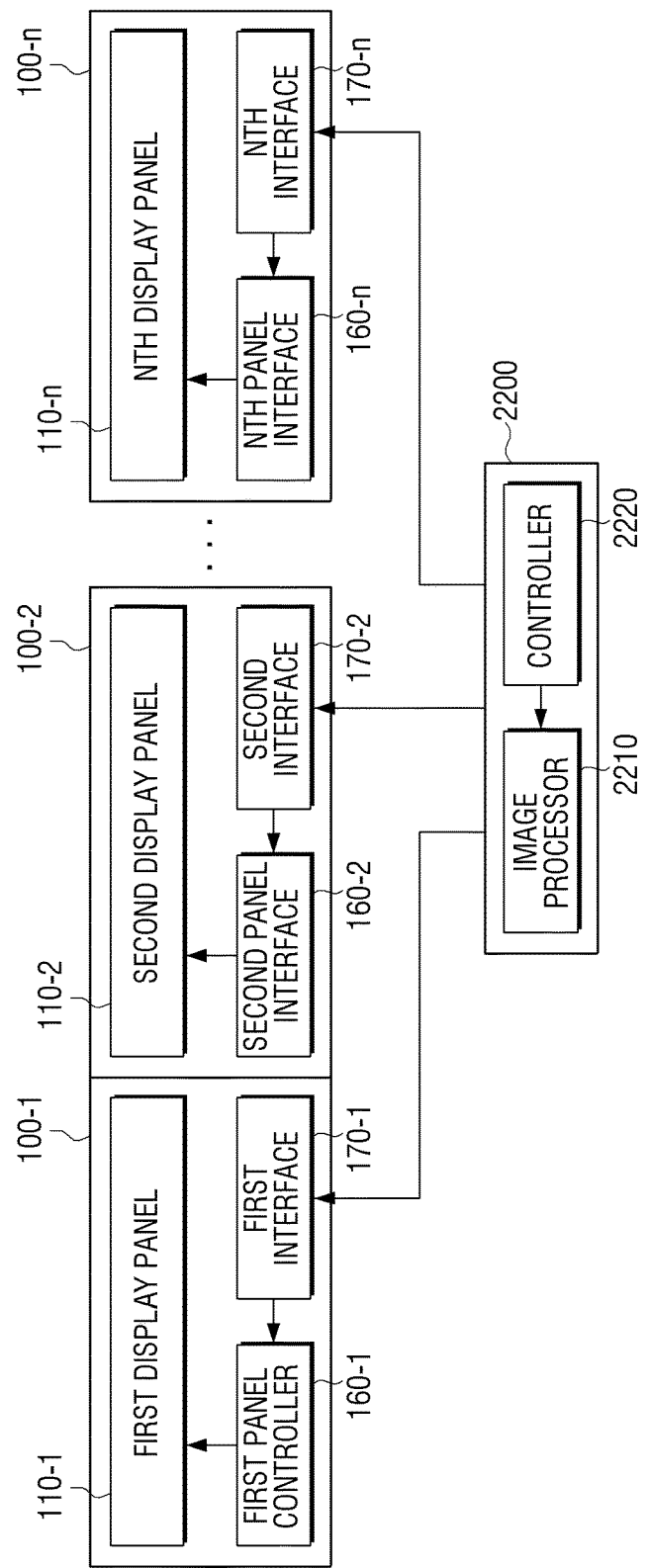
Figure 23:
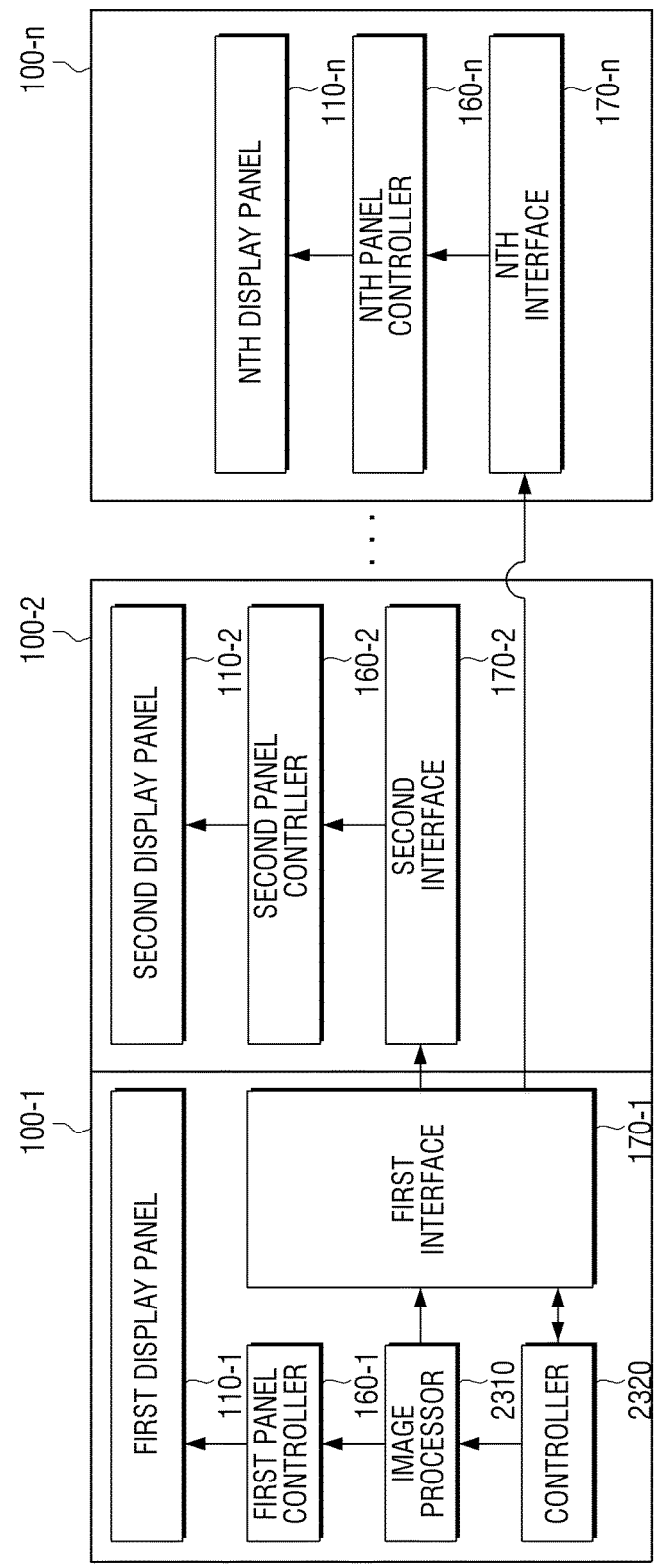

Such image correction of the tiled display system 1000 may be performed in a controller and an image processor. The controller and the image processor may be disposed on the various apparatuses according to exemplary embodiments. FIGS. 21-23 are block diagrams illustrating an internal configuration of the tiled display apparatus 1000 according to the various exemplary embodiments.

According to FIG. 21, each display apparatus 100-1, 100-2, . . . 100-n of the tiled display system 1000 may include a controller 2100-1, 2100-2, . . . , 2100-n and an image processor 2110-1, 2110-2, . . . , 2110-n respectively. The first display apparatus 100-1 includes the first display panel 110-1, the first controller 2100-1, and the first image processor 2110-1.

The first image processor 2110-1 is an element to process an image to be displayed in the first display panel 110-1. To be specific, the tiled display system 1000 may display, for example, broadcasting contents received through a tuner, contents displayed from a recordable display apparatus such as a DVD player, a Blue-ray disc player, contents displayed in an external terminal apparatus such as PC, lap-top PC, cell phone, tablet PC, and contents files stored in internal/external storage medium. The image processors 2110-1, 2110-2, . . . , 2110-n of each display apparatus 100-1, 100-2, . . . , 100-n may detect video data from contents input from these sources and perform image processing operations such as decoding, frame rate conversion, scaling, etc.

The first controller 2100-1 is installed inside the case 115-1 of the first display apparatus 100-1, and controls operations of the first image processor 2110-1 and the first display panel 110-1. The first controller 2100-1 controls the image processor 2110-1 to correct distortion of an image displayed in the bending area 112-1 of the first display panel 110-1.

The image processor 2110-1 processes an image so that pixel sizes recognized in the front side of the tiled display system may be equal. To be specific, the image processor 2110-1 divides the entire image to be displayed in the display panel 110-1 into the first image part which corresponds to the activated area 111-1 and the second image part which corresponds to the bending area 112-1, and changes pixel size of the second image part corresponding to the bending area 112-1. Detailed image processing method will be described below. Accordingly, an image may be seen as an image which is output from the bending area 112-1 of the first display panel 110-1 passing the optical member 130 and then output from the activated area 111-1 of the first display panel 110-1. Other display apparatuses 100-2, . . . , 100-n may process an image in the same manner as the first display apparatus 100-1. As the above is the same as the operations of the first display apparatus 100-1, overlapped explanation will be omitted with respect to the other display apparatuses 100-2, . . . , 100-n.

FIG. 22 is a block diagram illustrating the configuration of the tiled display system 1000 according to another exemplary embodiment. According to FIG. 22, a plurality of display apparatuses 100-1, 100-2, . . . , 100-n include display panels 110-1, 110-2, . . . , 110-n, panel controllers 160-1, 160-2, . . . , 160-n, and interface 170-1, 170-2, . . . , 170-n.

The panel controllers 160-1, 160-2, . . . , 160-n are elements to control operations of the display panels 110-1, 110-2, . . . , 110-n. To be specific, the panel controllers 160-1, 160-2, . . . , 160-n approve electrical signals of address electrodes and data electrodes of the display panels 110-1, 110-2, . . . , 110-n and controls on/off of each pixel. Accordingly, an image may be displayed.

Interface 170-1, 170-2, . . . , 170-n is an element to communicate with an external apparatus. The interface 170-1, 170-2, . . . , 170-n may communicate with an external apparatus according to communication specification such as Bluetooth, local area wireless technology (Wi-Fi), near field communication (NFC), and Zigbee, serial interface.

FIG. 22 illustrates that interface 170-1, 170-2, . . . , 170-n of each display apparatus 100-1, 100-2, . . . , 100-n communicating with a host apparatus 2200. The host apparatus 2200 includes the image processor 2210 and the controller 2220. The host apparatus 2200 may include various apparatuses such as a set-top box, personal computer (PC), lap-top PC, mobile phone, tablet PC, and a recordable medium playback apparatus, etc.

The image processor 2210 is an element to generate an image to be displayed in each display apparatus 100-1, 100-2, . . . , 100-n.

The controller 2220 generates an image to be displayed in each display apparatus 100-1, 100-2, . . . , 100-n by controlling the image processor 2210. The image processor 2210 divides a content image provided from random sources into a plurality of sub images to be suitable to the number and arrangement format of each display apparatus 100-1, 100-2, . . . , 100-n. The image processor 2210, in consideration of size of the bending area 112 and the activated area 111 of each display apparatus 100-1, 100-2, . . . , 100-n, adjusts pixel sizes of images in the edges of each sub image. Accordingly, an image viewed through the entire display apparatus 100-1, 100-2, . . . , 100-n may be viewed as pixels of the same size by areas. FIG. 22 illustrates that the separately provided host apparatus 2200 corrects an image, but the image processor and the controller may be mounted on one display apparatus which is operated as a main device from among a plurality of display apparatuses 100-1, 100-2, . . . , 100-n. FIG. 23 is a block diagram illustrating a configuration of the display apparatus 1000 according to an exemplary embodiment.

According to FIG. 23, the first display apparatus 100-1 which is one of the display apparatuses 100-1, 100-2, . . . , 100-n which constitute the tiled display system 1000 may include an image processor 2310 and a controller 2320. The controller 2320, when remaining display apparatuses 100-2, 103-1, . . . , 100-n are connected, may control the image processor 2310, generate a plurality of sub images to suit for the number and arrangement type of each display apparatus 100-1, 100-2, . . . , 100-n, and provide to the remaining display apparatuses 100-2, 103-1, . . . , 100-n through the interface 170-1, 170-2, . . . , 170-n. Accordingly, the panel controller 160-1-160-n of each display apparatus 100-1~100-n displays a sub image corresponding to its position of the panel controller 160-1, 160-2, . . . , 160-n in the display panels 110-1, 110-2, . . . , 110-n.

Figure 24:
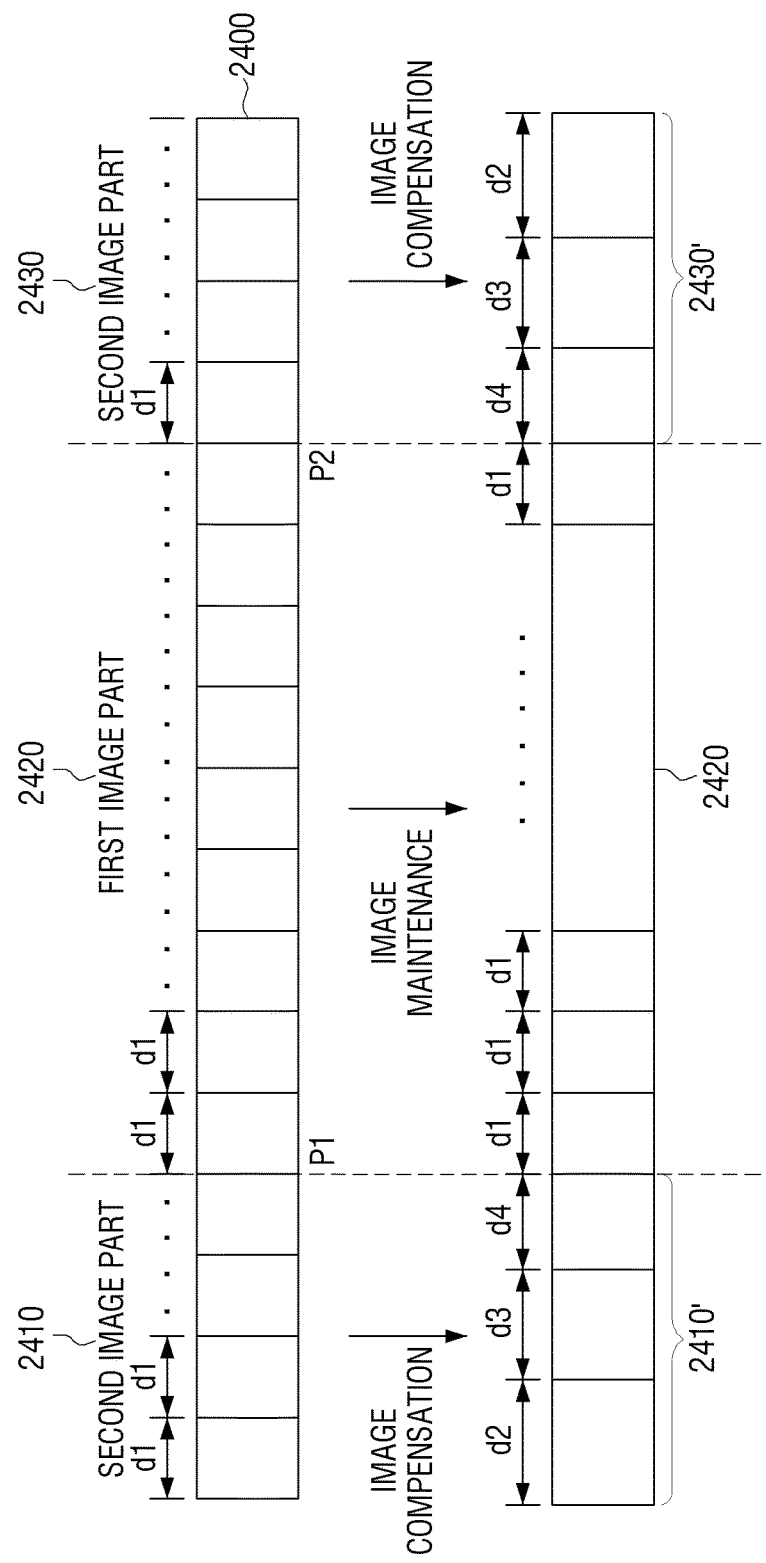
FIG. 24 is a view provided to explain a method for compensating images according to an exemplary embodiment.

FIG. 24 is a view illustrating an example of a method for compensating an image 2400. According to FIG. 24, the image 2400 corresponding to the entire display panel may be divided into the first image part 2420 which corresponds to the activated area 111 of the display panel 110, and the second image parts 2410, 2430 which correspond to bending areas 112.

The original resolution of the image 2400 is composed of pixels of the same size (d1), but once the bending areas 112 are bent, the image processor adjusts pixel sizes of the second image parts 2410, 2430. To be specific, the image processor adjusts pixels of the second image parts 2410, 2430 to be gradually increase in a direct proportion to a distance from bending points (P1, P2). According to FIG. 24, pixel size of the second image parts 2410, 2430 becomes d2, d3, d4 in a direct proportion to a distance from the bending point. The relation among the pixels is d2>d3>d4>d1. Pixel size of the first image part 2410 of the activated area 111 is maintained as d1. Accordingly, an image where the adjusted second image parts 2410', 2430' are combined with the first image part 2420 is provided to the display panel and displayed. Referring back to FIG. 20, the size of the second image parts 2410, 2430 before bending correspond to S of mathematical formulas 1 and 2, and size of the second image parts 2410', 2430' after bending correspond to B of mathematical formulas 1 and 2. The image processor, based on ratio between S and B, may calculate pixel values of the second image parts 2410', 2430' after bending to be the same, and then adjust pixel values by applying a weight to each pixel value in a direct proportion to a distance from a bending point. FIG. 24 illustrates a method where pixel sizes of the second image parts 2410, 2430 are adjusted differently from each other, but according to still another exemplary embodiment, pixels of the second image parts 2410, 2430 may be adjusted to be the same (for example, d2=d3=d4).

Figure 25:
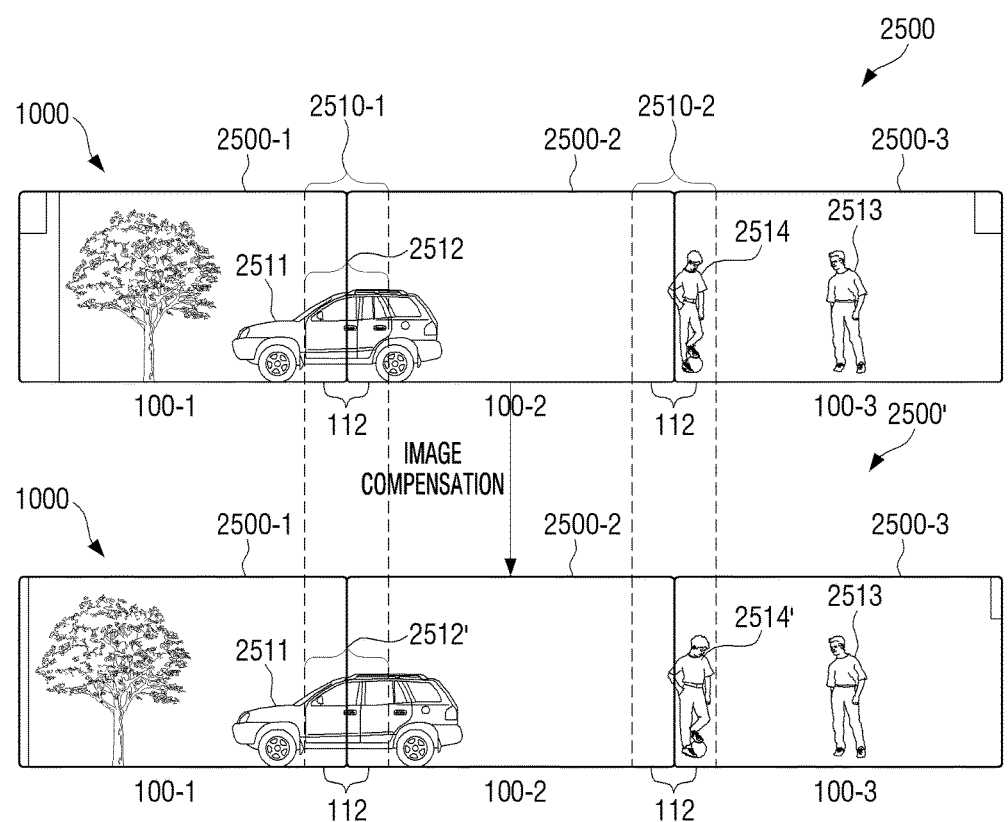
FIG. 25 is a view illustrating an example of compensating images according to a method of FIG. 24.

FIG. 25 is a view illustrating an example of an image corrected by a method according to an exemplary embodiment illustrated in FIG. 24. According to FIG. 25, in the tiled display system 1000 where three display apparatuses 100-1, 100-2 and 100-3 having bending areas 112 are arranged side by side, when an image 2500 is displayed as it is without image correction, image pixels of the connection areas 2510-1, 2510-2 including the bending areas 112 among each sub image 2500-1, 2500-2, 2500-3 may be viewed as if their width is reduced in the ending area 112. Accordingly, the objects 2512, 2514 which are displayed in the connection areas 2510-1, 2510-2 may be viewed as if pinched/squeezed in a horizontal direction compared to the objects 2511, 2513 displayed in a normal section. In this state, when image correction to increase width of image pixels of the connection areas 2510-1, 2510-2 is performed, objects 2512', 2514' having a normal shape may be viewed in the connection areas 2510-1, 2510-2.

When an image is corrected as illustrated in FIGS. 24 and 25, a part of left edge of a leftmost sub image 2500-1 and a part of right edge of a rightmost image 2500-3 are cut off. Therefore, according to another exemplary embodiment, pixel size of the activated area 111 may be reduced a little bit, and the entire image may be maintained as it is.

Figure 26:
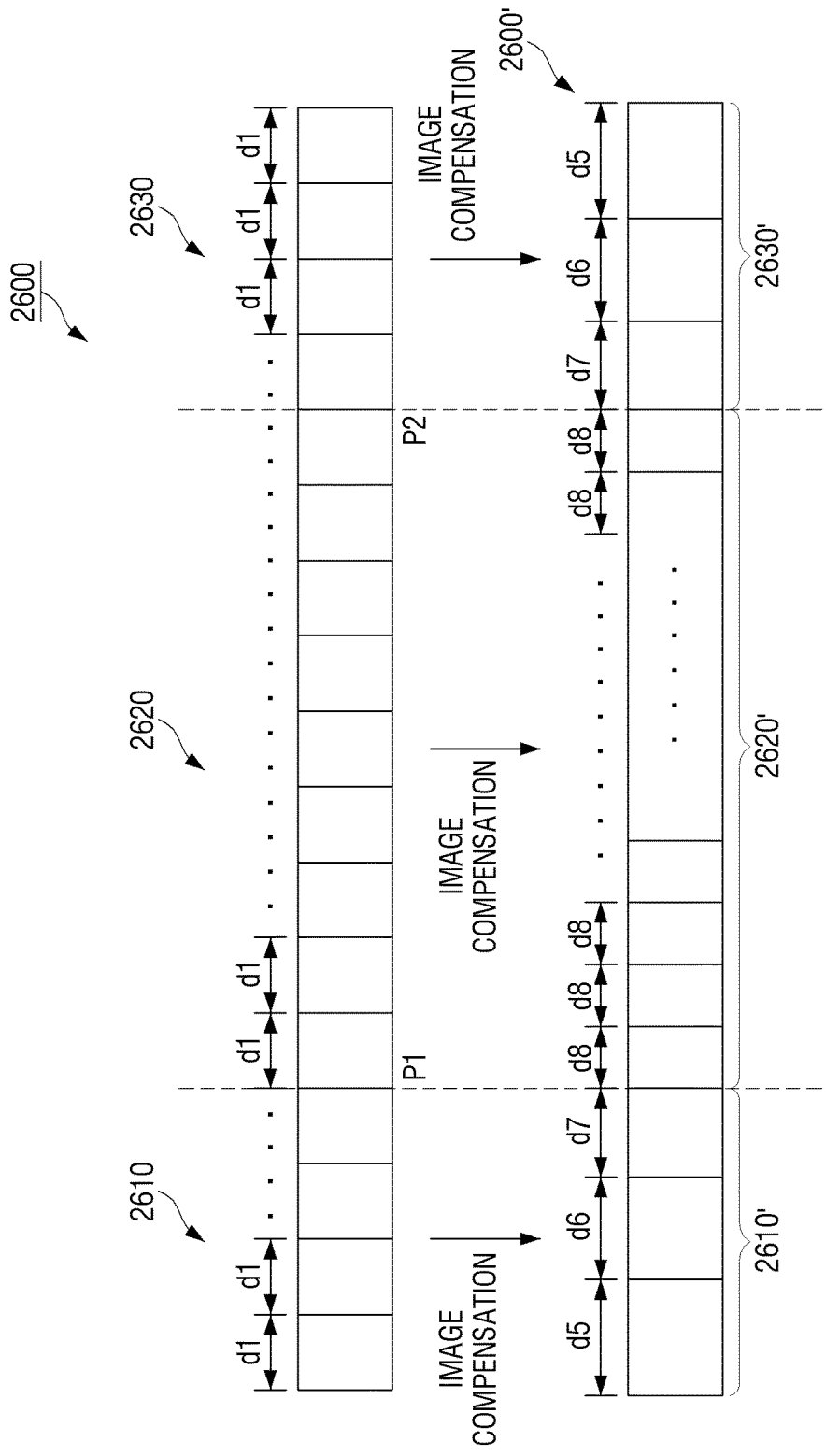
FIGS. 26 and 27 are views illustrating a method for compensating images according to various exemplary embodiments.

FIG. 26 is a view illustrating a method for compensating an image 2600 according to another exemplary embodiment. According to FIG. 26, an image processor divides the image 2600 into the first image part 2620 of the activated area 111 and the second image parts 2610, 2630 of the bending areas 112, and adjusts pixel size of each areas 2610, 2620, 2630. For example, in the second image parts 2610, 2630, pixels may be adjusted to pixels of different sizes (d5, d6, d7) where d5>d6>d7 in a direct proportion to a distance from the bending points (P1, P2), and the original pixel size (d1) of the first image part 2620 is reduced and adjusted to a pixel of size of d8. Accordingly, by combining corrected parts 2610', 2620', 2630', a corrected image 2600' is displayed. In the exemplary embodiment, instead of increasing pixel sizes of the second image parts 2610, 2630, pixel size of the first image part 2620 may be reduced, and thus, an entire image may be displayed without being cut off at the left-most and right-most ends of the image 2600.

When bending angle is not gentle but steep, a part of the bending area 112 may form a vertical surface as much as 90 degrees with the activated area 111. According to still another exemplary embodiment, within the bending area, pixels of a flat surface which is bent by 90 degrees are adjusted to be the same size, and pixels of a surface which is being bent may be adjusted to be the different sizes from each other.

Figure 27:
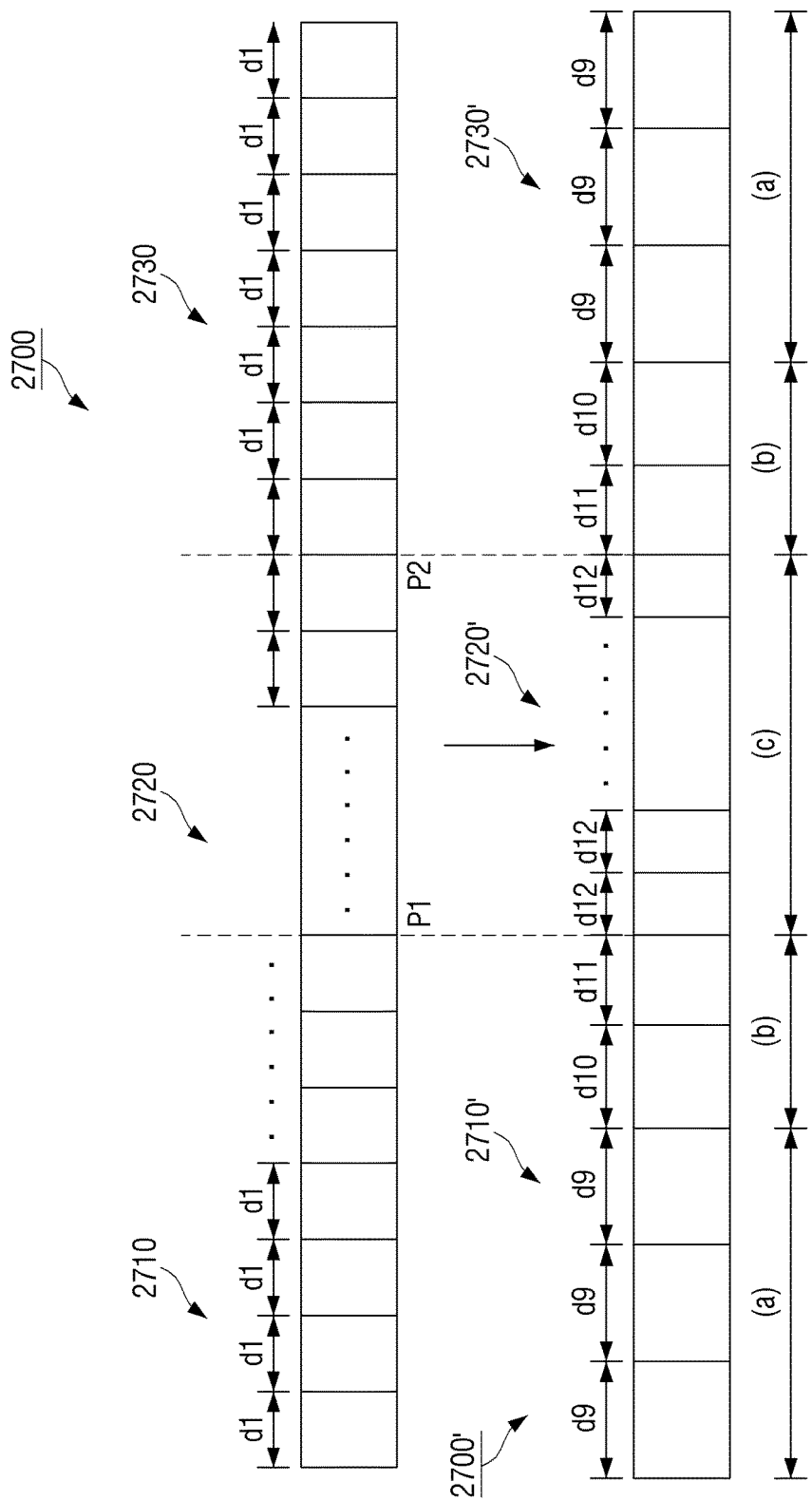

FIG. 27 is a view illustrating a method for compensating an image 2700 according to yet another exemplary embodiment. According to FIG. 27, when the image 2700 includes pixels with a size of d1, the image processor corrects the second image parts 2710, 2730 corresponding to the bending area 112, and the first image part 2720 corresponding to the activated area 111, respectively. The image processor divides the second image parts 2710, 2730 into two parts (a) and (b), and adjusts pixel size of a part (a) to d9, and adjust pixel size of the other part (b) to different sizes such as d10 and d11. The image processor gradually increases pixel size of the part (b) in a direct proportion to a distance from the bending points (P1, P2). In addition, the image processor reduces pixel sizes of the first image part 2720 from d1 to d12. Accordingly, the image 2700' where the corrected image parts 2710', 2720', 2730' are combined may be provided to the display panel and displayed.

As described above, an image processor may be installed at each display apparatus, or installed only at a main display apparatus from among display apparatuses, or installed at a separate host apparatus.

Figure 28:
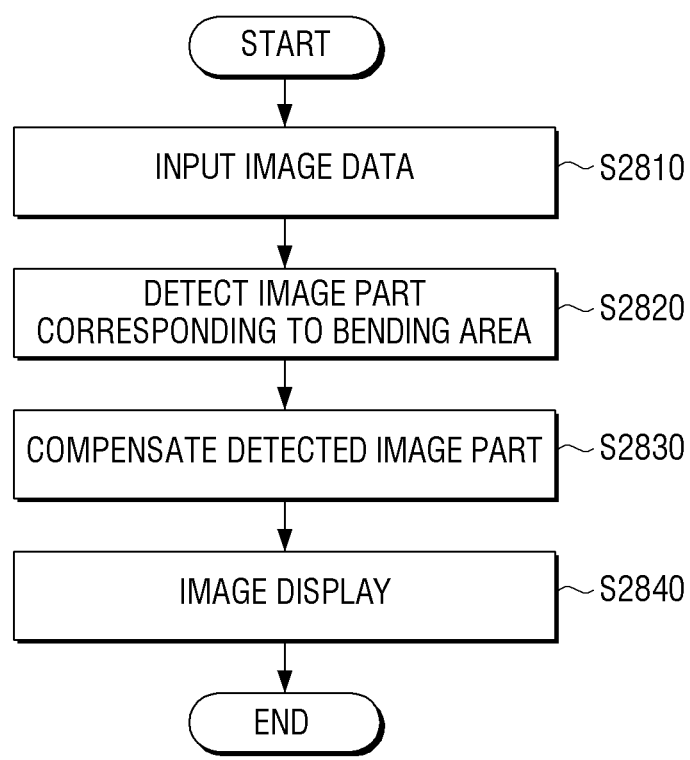
FIG. 28 is a flowchart explaining a method for compensating images according to an exemplary embodiment.

FIG. 28 is a flow chart illustrating a method for compensating an image according to various exemplary embodiments. According to FIG. 28, the tiled display system 1000, when an image data is input (S2810), detects an image part which corresponds to a bending area 112 (S2820). Size of the bending area 112 may be pre-calculated and stored in the tiled display system, or may be input through communication among display apparatuses. The tiled display system 1000 corrects pixel size of detected image parts (S2830). According to exemplary embodiments, pixel sizes of an image part which corresponds to an activated area 111 may be corrected. The detailed method has been detailed in FIGS. 24, 26, 27, and thus, will not be further described. Accordingly, corrected images are displayed (S2840). Therefore, even in a connection area, an image is not pinched/squeezed and can be viewed naturally.

FIG. 28 illustrates that an image part to be corrected by the tiled display system 1000 is detected based on size of the bending area, but according to a yet another exemplary embodiment, an image may be directly photographed and corrected using a camera.

Figure 29:
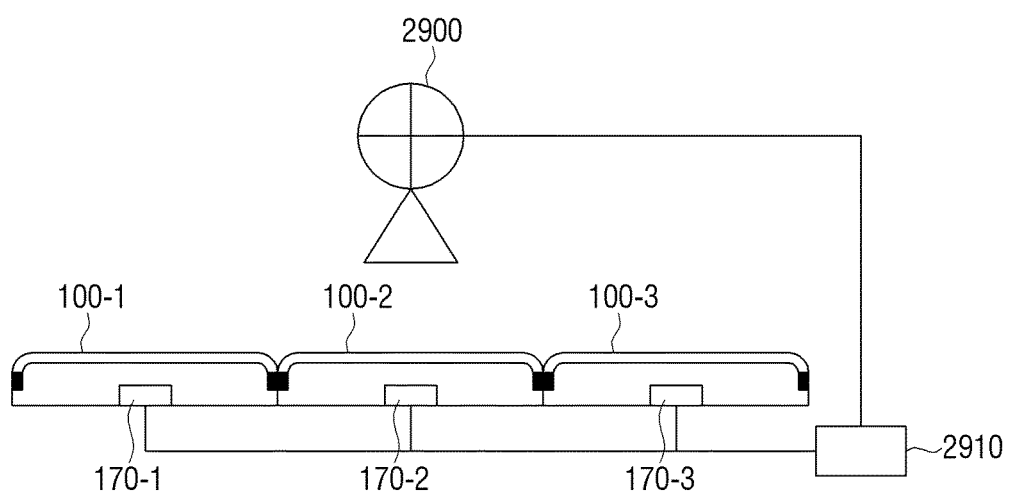
FIG. 29 is a view illustrating a configuration for adjusting display attributes of the tiled display system using a camera according to an exemplary embodiment.

FIG. 29 is a view illustrating the configuration of the tiled display system which further includes a camera. According to FIG. 29, the tiled display system further includes not only the plurality of display apparatuses 100-1, 100-2, 100-3 but also a camera 2900 and a host apparatus 2910.

According to FIG. 29, the camera 2900 is disposed in the front of a tiled display system 1000 and photographs the tiled display system 1000. The photographed image is provided to the host apparatus 2910. The host apparatus 2910 analyzes the photographed image, detects a distortion point, and an image of the distortion point. The corrected image is provided to each display apparatus 100-1, 100-2, 100-3 through the interface 170-1, 170-2, 170-3. The host apparatus 2910 may correct an image by using geometric distortion adjustment technology. To be specific, the host apparatus 2910 captures an image of each display apparatuses 100-1, 100-2, 100-3 within the photographed image. The host apparatus 2910 calculates transformation matrix using pixel values between original images provided to each display apparatus 100-1, 100-2, 100-3 and captured images, and calculates inverse matrix. The host apparatus 2910, by applying the inverse matrix to the original images, may generate a corrected image data, and provide the image data back to each display apparatus 100-1, 100-2, 100-3. When a separate host apparatus 2910 is not present, but a controller and an image processor are present in each display apparatus, a photographed image of the camera 2900 may be provided to each display apparatus and used for correction processing. Alternatively, if a controller and an image processor are present in a main display apparatus, a photographed image may be provided to a main display apparatus and used for correction.

The tiled display system 1000 is used by connecting a plurality of display apparatuses 100-1, 100-2, 100-3. These display apparatuses 100-1, 100-2, 100-3 may have various display attributes. The display attributes include various characteristics of displaying an image. To be specific, display attributes may include at least one of color temperature, pixel resolution, chromaticity, chrome, and contrast. If such display attributes are different in each apparatus, a viewer 5 may notice inconsistencies in image quality of the displayed image. Accordingly, according to yet another exemplary embodiment, a plurality of display apparatus may adjust and unify display attributes based on one display apparatus which is set as a reference.

As illustrated in FIG. 29, when the tiled display system 1000 includes a camera 2900, display attributes may be adjusted using a photographed image of the camera 2900. To be specific, while the tiled display system 1000 displays a random mono color pattern, a viewer 5 may photograph each display panel of the tiled display system 1000. When setting one of the display panels from among images photographed as a reference, display attributes of other display panels should be adjusted so that these attributes may be the same as distributes of the reference display panel. The camera 2900 may send the photographed image to the host apparatus 2910. The host apparatus 2910 extracts within a photographed image R, G, B values of the display panel which is designated as the reference display panel, and R, G, B values of other display panels. The host apparatus 2910 may calculate transformation matrix among the extracted R, G, B values of the display panels. The host apparatus 2910 may perform inverse transformation of transformation matrix, calculate color correction matrix (CCM), and provide the CCM to each display apparatus 100-1, 100-2, 100-3. When the CCM is received through the interface 170-1, 170-2, 170-3, each display apparatus 100-1, 100-2, 100-3 receives the CCM. When image data to be displayed is input, each display apparatus 100-1, 100-2, 100-3, corrects color of the display panel by applying the CCM. Not only color, but also color temperature, pixel resolution, chromaticity, chrome, and contrast may be corrected by sensing in the same manner.

Alternatively, each display apparatus may mutually share set value of the display attributes through interface. For example, each display apparatus may notify information on apparatus ID, pixel resolution information, color temperature information, chromaticity information, chrome information, contrast information to peripheral display apparatuses using Near Field Communication (NFC) method. Accordingly, each display apparatus may secure display attribute table of peripheral display apparatuses. With such configuration, when one display apparatus is selected as a reference, display attributes of the other display apparatus may be changed to match the display attributes of the reference apparatus. Alternatively, when a reference display apparatus is set as a default, the reference display apparatus may provide display attribute information of the reference display apparatus to other display apparatuses and adjust the display attributes information of the other apparatuses.

Figure 30:
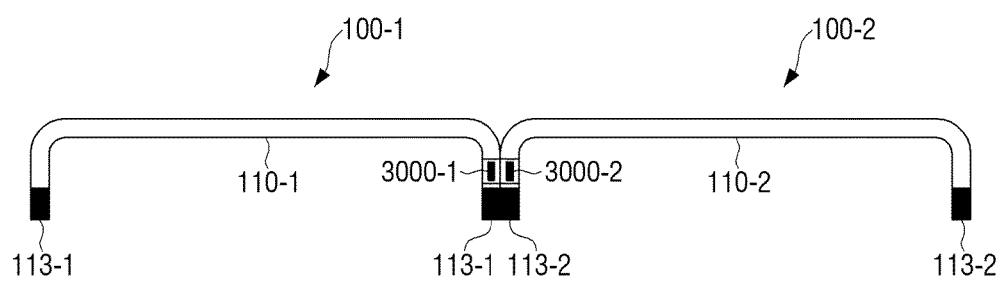
FIG. 30 is a view illustrating a configuration of a display apparatus to adjust display attributes in the tiled display system according to an exemplary embodiment.

FIG. 30 is a view illustrating another method of adjusting and unifying display attributes. According to FIG. 30, each of a plurality of display apparatuses 100-1, 100-2 further includes sensors 3000-1, 3000-2 disposed at one of the edges of the display panel 110-1, 110-2. Accordingly, each display apparatus 100-1, 100-2 may sense display attributes of peripheral display apparatuses using the sensors 3000-1, 3000-2. Display attributes of each display apparatus may be adjusted based on sensing results. This sensing and adjusting display attributes may be controlled by a controller mounted on each display apparatus or host apparatus. Position of the controller and image processor to handle this work may be changed variously as previously illustrated in FIGS. 21, 22 and 23. A sensor may be realized as various types such as photodiode or Charged Coupled Devices (CCD) array. FIG. 30 illustrates that each display apparatus 100-1, 100-2 has one sensor 3000-1, 3000-2 only at a connection area, but the number and position of the sensor 3000-1, 3000-2 are not limited thereto. For example, when three or more display apparatuses are arranged side by side or connected in a matrix format, sensors may be disposed at edges of top, bottom, left, and right of each of the display apparatuses. Further, a plurality of different sensors may be disposed in one direction. Accordingly, various display attributes of peripheral display apparatus may be sensed at the same time. In addition, FIG. 30 illustrates that the sensors 3000-1, 3000-2 are disposed within a bending area of the display panels 110-1, 110-2, but the exemplary embodiment is not limited thereto. For example, the sensors 3000-1, 3000-2 may be disposed on the inactivated areas 113-1, 113-2 in a way to sense a bending area, or on the case 115-1, 115-2 (FIG. 2).

Figure 31:
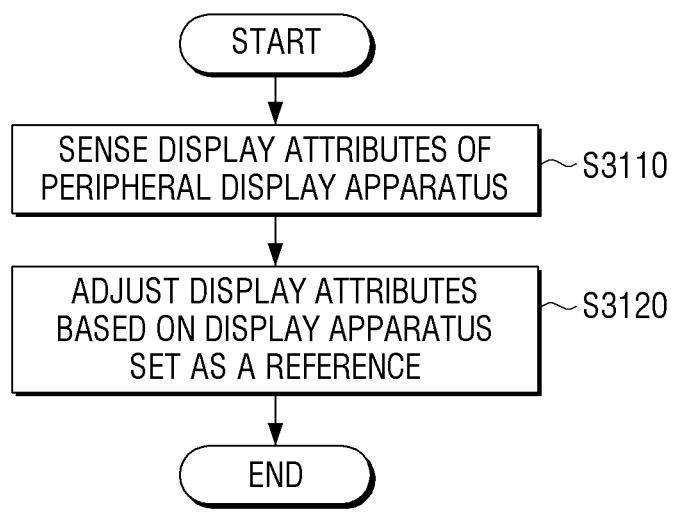
FIG. 31 is a flowchart illustrating a method for adjusting display apparatuses according to still another exemplary embodiment.

FIG. 31 is a flowchart illustrating a method for adjusting display attributes according to yet another exemplary embodiment. According to FIG. 31, a display apparatus may sense display attributes of a peripheral display apparatus (S3110). When display attributes is sensed, the display apparatus adjusts display attributes based on the display apparatus set as a reference (S3120). Sensing may be performed by a separately prepared camera or by the sensor disposed inside a display apparatus.

According to the various exemplary embodiments shown above, the tiled display system may connect a plurality of display apparatuses and to make it appear as if an image is displayed at a connection area using an optical member. In addition, the image to be displayed on the connection area may be appropriately corrected, and partial distortion of the image may be avoided. By adjusting and unifying attributes of each display apparatus, the display apparatuses may be recognized as one large screen.

While exemplary embodiments have been particularly shown and described above, it will be understood by those of ordinary skill in the art that various changes in form and details may be made therein without departing from the spirit and scope of the inventive concept as defined by the following claims.

What is claimed is:
1. A tiled display system comprising:
a plurality of display apparatuses configured to display an image, each of the plurality of display apparatuses comprising a display panel; and
a plurality of optical members;
wherein the display panel comprises:
an activated area which comprises a flat surface area and a curved surface area, the flat surface area and the curved surface area being configured to display the image; and
an inactivated area extending from the curved surface area of the activated area;
wherein each of the plurality of optical members is provided on the curved surface area and configured to output light emitted from the curved surface area, and
wherein each of the plurality of display apparatuses is configured to modify image data for a portion of the image corresponding to the light emitted from the curved surface area, and
wherein each of the plurality of optical members comprises a curved surface that corresponds to the curved surface area of the display panel.
2. The system as claimed in claim 1, wherein each optical member comprises:
a first surface which extends parallel with the flat surface area;
a second surface which extends orthogonal from the first surface and extending parallel with the inactivated area;
a first curved surface which is provided between a back end of the first surface and a back end of the second surface, and has a shape corresponding to the curved surface area; and
a second curved surface which faces the first curved surface, is provided between a front end of the first surface and the second surface, and has a radius of curvature which is less than the first curved surface,
wherein each optical member is configured to output the light emitted from the curved surface area of the display panel to the first surface through the first curved surface.
3. The system as claimed in claim 2, wherein each optical member comprises a plurality of light guide layers provided between the first curved surface and the first surface and configured to guide the emitted light from the curved surface area of the display panel to the first surface.
4. The system as claimed in claim 3, wherein each of the plurality of light guide layers comprises a mirror on a boundary surface of each of the plurality of light guide layers.
5. The system as claimed in claim 2, wherein each optical member comprises a plurality of cylindrical light guide poles provided between the first curved surface and the first surface and configured to guide the emitted light from the curved surface area of the display panel to the first surface.

6. The system as claimed in claim 1, wherein each optical member is made of transparent glass or plastic.

7. The system as claimed in claim 1, wherein each optical member comprises a prism covering a notch provided between a connection area of two adjacent display apparatuses of the plurality of display apparatuses.

8. The system as claimed in claim 7, wherein the prism comprises:
- a transparent housing having a shape corresponding to the notch; and
- transparent liquid filled in the transparent housing.

9. The system as claimed in claim 1, wherein at least one display panel of the plurality of display apparatuses comprises:
- a flexible panel;
- a case configured to support the at least one display panel; and
- a supporting frame provided inside the case and configured to maintain a curvature of the curved surface area of the flexible panel.

10. The system as claimed in claim 1, wherein each optical member comprises a Gabor super lens provided on a notch formed between a connection area of two adjacent display apparatuses.

11. The system as claimed in claim 10, wherein the Gabor super lens comprises a concave surface.

12. The system as claimed in claim 1, wherein the display panel of each of the plurality of display apparatuses comprises a concave display panel or a convex display panel.

13. The system as claimed in claim 1, wherein the plurality of display apparatuses are arranged along a convex surface, a concave surface, or a zigzag-shaped surface.

14. The system as claimed in claim 1, wherein each of the plurality of display apparatuses comprises:
- a controller configured to control operations of the display panel; and
- an image processor configured to perform image correction.

15. The system as claimed in claim 14, wherein the image processor is configured to divide the image into a first image part corresponding to light emitted from the flat surface area and a second image part corresponding to the light emitted from the curved surface area, and configured to change a pixel size of the second image part.

16. The system as claimed in claim 15, wherein the image processor is configured to adjust the pixel size of the second image part to increase in a direct proportion to a corresponding distance from a bending point to a corresponding pixel, and configured to adjust a pixel size of the first image part to decrease according to a size of the image and a degree of pixel size increase of the second image part.

17. The system as claimed in claim 1, wherein display attributes of the plurality of display apparatuses are configured to be adjusted to match display attributes of a reference display apparatus.

18. The system as claimed in claim 17, wherein the display attributes comprise at least one of color temperature, pixel resolution, chromaticity, chroma, and contrast.

19. The system as claimed in claim 17, wherein each of the plurality of display apparatuses further comprises a plurality of sensors disposed on an edge of the display panel, and
wherein the plurality of sensors are configured to sense display attributes of peripheral display apparatuses and each display apparatus is configured to adjust display attributes of each display apparatus according to a result of the sensing by the plurality of sensors.

20. The system as claimed in claim 1, further comprising:
a host device configured to communicate with the plurality of display apparatuses,
wherein the host device comprises:
an image processor configured to correct each of partial images displayed on each of the plurality of display apparatuses; and
a controller configured to send each of the partial images corrected by the image processor to a corresponding display panel of the plurality of display apparatuses.

* * * * *